US010863336B2

(12) United States Patent
Guo et al.

(10) Patent No.: US 10,863,336 B2
(45) Date of Patent: Dec. 8, 2020

(54) ELECTRONIC DEVICE AND METHOD FOR WIRELESS COMMUNICATION

(71) Applicant: Sony Corporation, Tokyo (JP)

(72) Inventors: Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,797

(22) PCT Filed: May 2, 2018

(86) PCT No.: PCT/CN2018/085312
§ 371 (c)(1),
(2) Date: Feb. 7, 2019

(87) PCT Pub. No.: WO2018/202034
PCT Pub. Date: Nov. 8, 2018

(65) Prior Publication Data
US 2019/0174286 A1     Jun. 6, 2019

(30) Foreign Application Priority Data

May 4, 2017  (CN) .......................... 2017 1 0308297

(51) Int. Cl.
*H04W 4/80*      (2018.01)
*H04W 88/02*   (2009.01)
(Continued)

(52) U.S. Cl.
CPC .............. *H04W 4/80* (2018.02); *H04W 4/00* (2013.01); *H04W 72/02* (2013.01);
(Continued)

(58) Field of Classification Search
CPC ......... H04W 4/80; H04W 4/00; H04W 72/02; H04W 72/085; H04W 88/02; H04W 4/40–90
See application file for complete search history.

(56) References Cited

U.S. PATENT DOCUMENTS 9,363,827 B2 *  6/2016  Li ........................ H04W 76/14
2006/0072505 A1 *  4/2006  Carrillo ................ H04L 41/046
370/331
(Continued)

FOREIGN PATENT DOCUMENTS

CN       102111316      *  6/2011
CN       102111316  A     6/2011
(Continued)

OTHER PUBLICATIONS

International Search Report dated Jul. 25, 2018 for PCT/CN2018/085312 filed on May 2, 2018, 9 pages including English translation.

*Primary Examiner* — Yuwen Pan
*Assistant Examiner* — Angelica M Perez
(74) *Attorney, Agent, or Firm* — Xsensus, LLP

(57) ABSTRACT

Provided are an electronic device and method for wireless transmission. The electronic device comprises: a processing circuit configured to confirm a network structure of a motorcade and determine a link stability measurement configuration corresponding to the network structure, wherein the link stability measurement configuration is used for a receiving-end apparatus of a link to determine the stability of the link according to a receiving state of a transmitted content.

15 Claims, 13 Drawing Sheets

(51) Int. Cl.
*H04W 72/08* (2009.01)
*H04W 72/02* (2009.01)
*H04W 4/00* (2018.01)
*H04W 72/04* (2009.01)
*H04W 92/18* (2009.01)

(52) U.S. Cl.
CPC ..... *H04W 72/0486* (2013.01); *H04W 72/085* (2013.01); *H04W 88/02* (2013.01); *H04W 72/0406* (2013.01); *H04W 92/18* (2013.01)

(56) References Cited

U.S. PATENT DOCUMENTS

2016/0128075 A1* 5/2016 Kremo ............... H04W 72/085
                                                                 455/506
2016/0334230 A1 11/2016 Ross et al.

FOREIGN PATENT DOCUMENTS

| CN | 105324950 A | 2/2016 |
| CN | 106485947 A | 3/2017 |

* cited by examiner

ELECTRONIC DEVICE AND METHOD FOR WIRELESS COMMUNICATION

CROSS-REFERENCE TO RELATED APPLICATIONS

This application is based on PCT filing PCT/CN2018/085312, filed May 2, 2018, and claims the priority to Chinese Patent Application No. 201710308297.1, titled "ELECTRONIC DEVICE AND METHOD FOR WIRELESS COMMUNICATION", filed with China National Intellectual Property Administration on May 4, 2017, which is incorporated herein by reference in its entirety.

FIELD OF THE INVENTION

Embodiments of the present disclosure generally relate to the field of wireless communications, in particular to system configuration in the Internet of Vehicles, and more particularly to an electronic apparatus and a method for wireless communications.

BACKGROUND OF THE INVENTION

With the rapid development of computer and communication technology, wireless apparatus and wireless data grow at an exponential rate, and the diversity of wireless service cases related to system coexistence also changes continuously, which brings unlimited business opportunities and thus attracts increasing widespread attention in industry. For example, Internet of Vehicles (V2V), originally co-developed by automobile manufacturers, is used for driving safety management within a vehicle system and between vehicles close in distance, so as to reduce the frequency of traffic accidents. Now, the Internet of Vehicles has evolved to networking in-vehicle communication apparatus, and transmits and shares information over the network, thereby improving safety of vehicle driving.

The core object of the Internet of Vehicles is to ensure that a vehicle driving status or accident warning information can be reliably and rapidly interchanged between vehicles to guarantee safe driving and reduce the impact of accidents.

In the current research on V2X, the support of an advanced driving mode is added primarily. The advanced driving mode includes Vehicle Platooning Driving, Semi-automated Driving, Full-automated Driving, and Remote Driving. A vehicle platooning communication system may be described as a group of vehicles driving in a chained manner close to each other. In order to control the distance between vehicles, information required to be interchanged between the vehicles includes at least: vehicle speed, driving direction, and intention such as braking or accelerating. Driving in a vehicle platooning mode can reduce the distance between vehicles, energy consumption and the number of drivers. Each vehicle platooning member is located within a communication range of a direct neighbor who is also the vehicle platooning member. Therefore, in the vehicle platooning communication system, requirements on low latency and high reliability for communications between the vehicle platooning members become more stringent. It is necessary to provide link management technology for actual requirements of the vehicle platooning driving mode.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to one aspect of the present application, an electronic apparatus for wireless communications is provided. The electronic apparatus includes: processing circuitry, configured to: confirm a network structure of a vehicle platooning; and determine link stability measurement configuration corresponding to the network structure, the link stability measurement configuration being used for determining stability of a link by a receiving end device of the link according to a receiving state with respect to transmission content.

According to another aspect of the present application, an electronic apparatus for wireless communications is provided. The electronic apparatus includes: processing circuitry, configured to: perform measurement of link stability based on link stability measurement configuration for a link, wherein a receiving end of the link is a vehicle where the electronic apparatus is located, and a transmitting end of the link is another vehicle in a vehicle platooning; and trigger a corresponding event in response to a result of the measurement.

According to another aspect of the present application, a method for wireless communications is provided. The method includes: confirming a network structure of a vehicle platooning; and determining link stability measurement configuration corresponding to the network structure, the link stability measurement configuration being used for determining stability of a link by a receiving end device of the link according to a receiving state with respect to transmission content.

According to another aspect of the present application, a method for wireless communications is provided. The method includes: performing measurement of link stability based on link stability measurement configuration for a link, wherein a receiving end of the link is a vehicle where the electronic apparatus is located, and a transmitting end of the link is another vehicle in a vehicle platooning; and triggering a corresponding event in response to a result of the measurement.

With the above electronic apparatus and method according to the present application, the link stability is measured by using the link stability measurement configuration corresponding to the network structure of the vehicle platooning, such that the link stability for the vehicle platooning can be measured quickly and accurately, thereby achieving communications with high reliability and low latency for the vehicle platooning members.

According to one aspect of the present application, an electronic apparatus for wireless communications is provided. The electronic apparatus includes: processing circuitry, configured to: acquire a parameter related to sensing operations of vehicle platooning members; and generate, based on the parameter, sensing configuration for a plurality of vehicle platooning members in a vehicle platooning, wherein the plurality of vehicle platooning members perform coordinated sensing based on the sensing configuration.

According to another aspect of the present application, a method for wireless communications is provided. The method includes: acquiring a parameter related to sensing operations of vehicle platooning members; and generating, based on the parameter, sensing configuration for a plurality of vehicle platooning members in a vehicle platooning, wherein the plurality of vehicle platooning members perform coordinated sensing based on the sensing configuration.

With the above electronic apparatus and method according to the present application, the sensing configuration for each of the vehicle platooning members is generated, such that the multiple vehicle platooning members can perform coordinated sensing, thereby improving accuracy and speed of the sensing, and thus achieving communications with high reliability and low latency for the vehicle platooning members.

According to other aspects of the present disclosure, there are further provided computer program codes and computer program products for implementing the above mentioned methods as well as a computer-readable storage medium recording the computer program codes for implementing the methods.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

Figure 3:
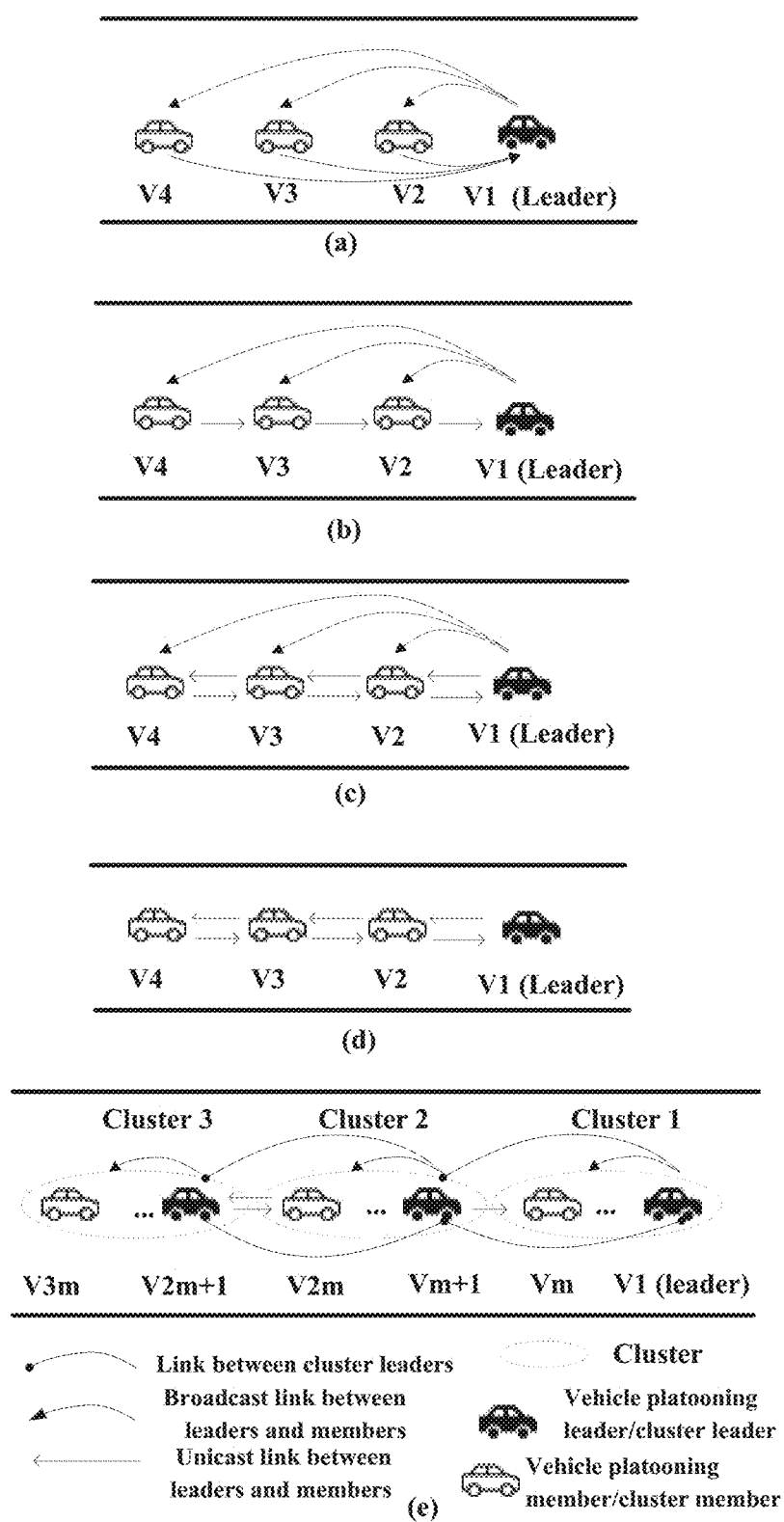
Figure 4:
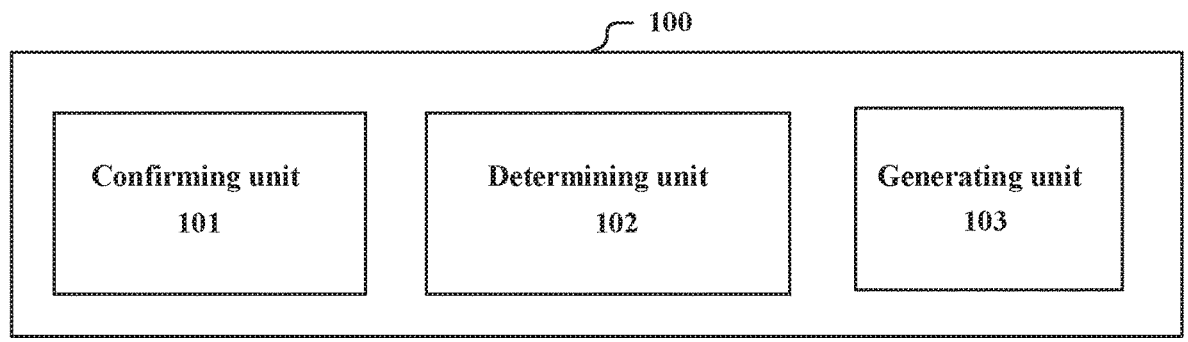
Figure 5:
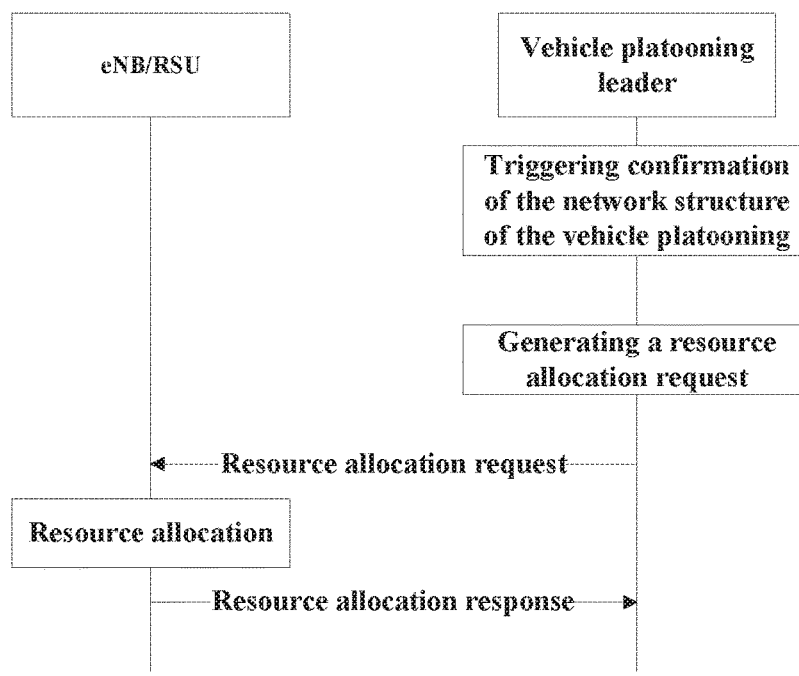
Figure 6:
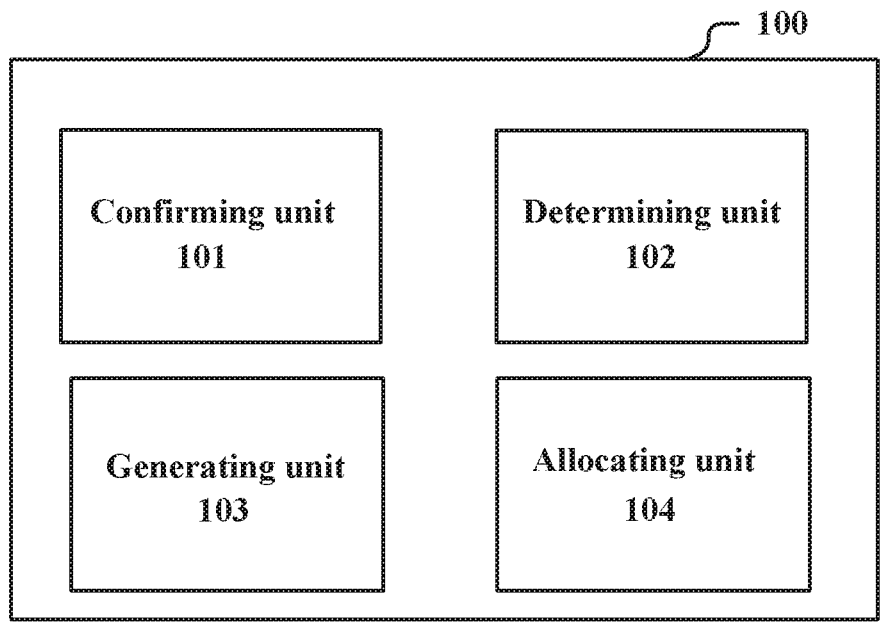
Figure 7:
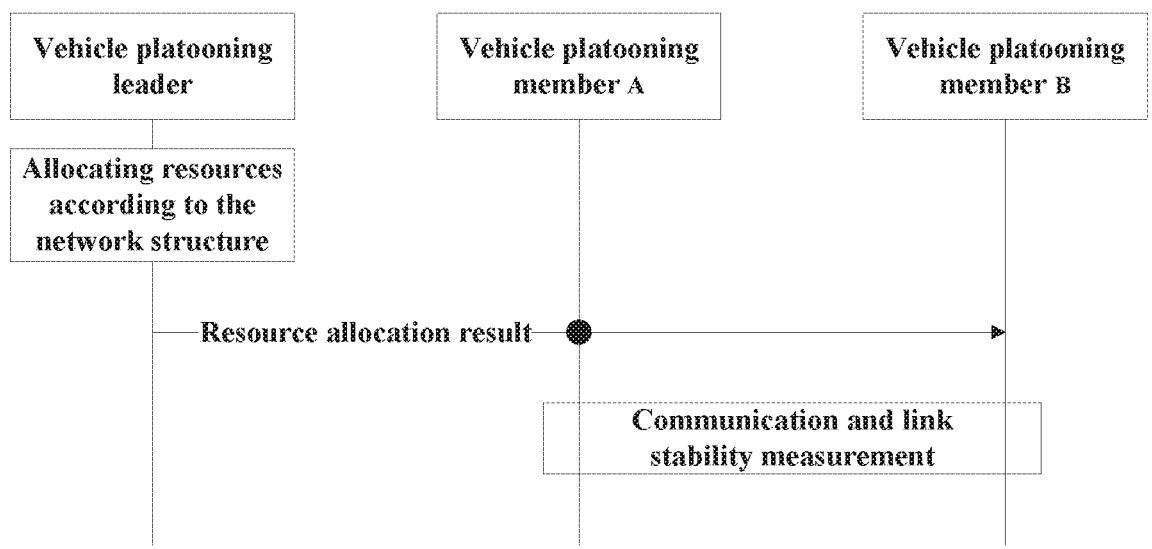
Figure 8:
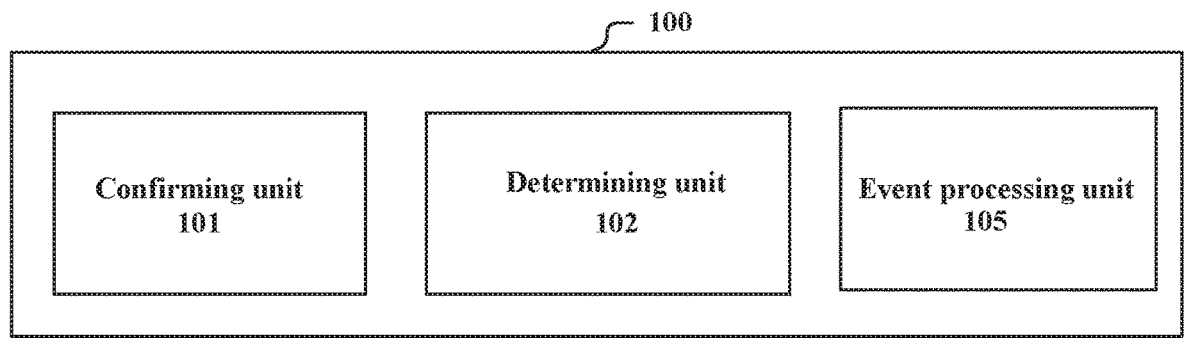
Figure 9:
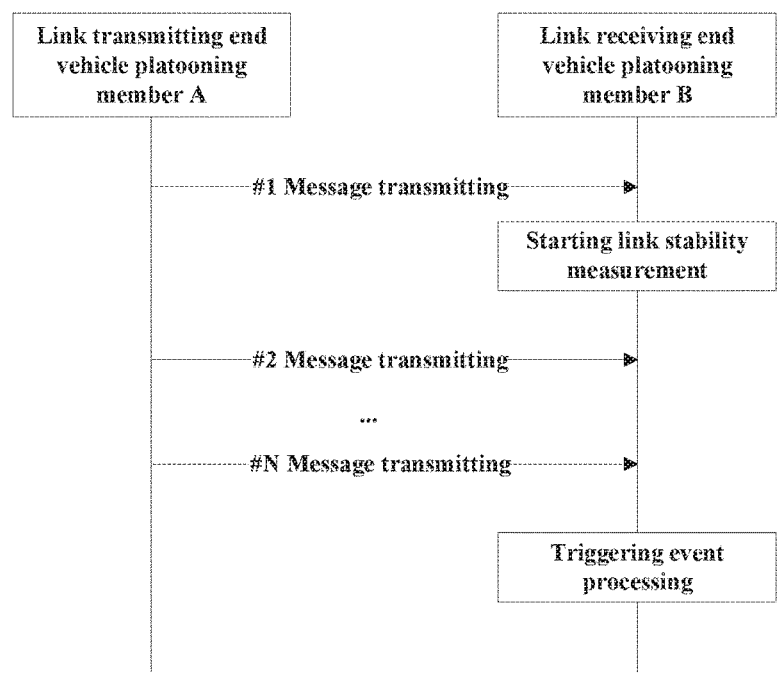
Figure 10:
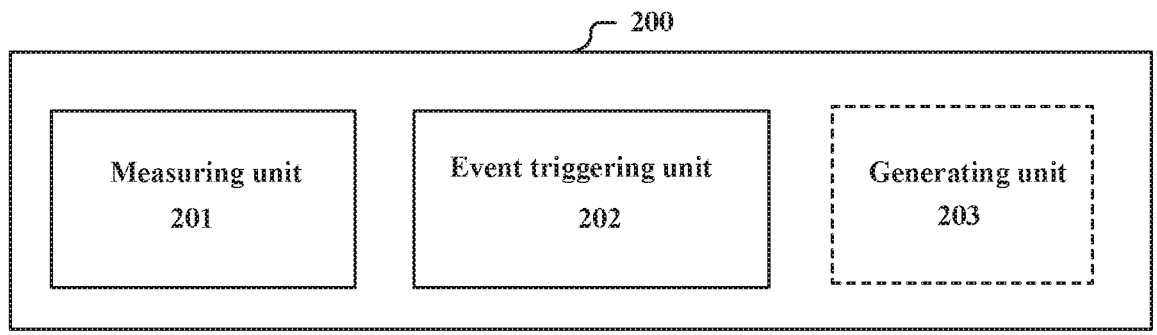
Figure 11:
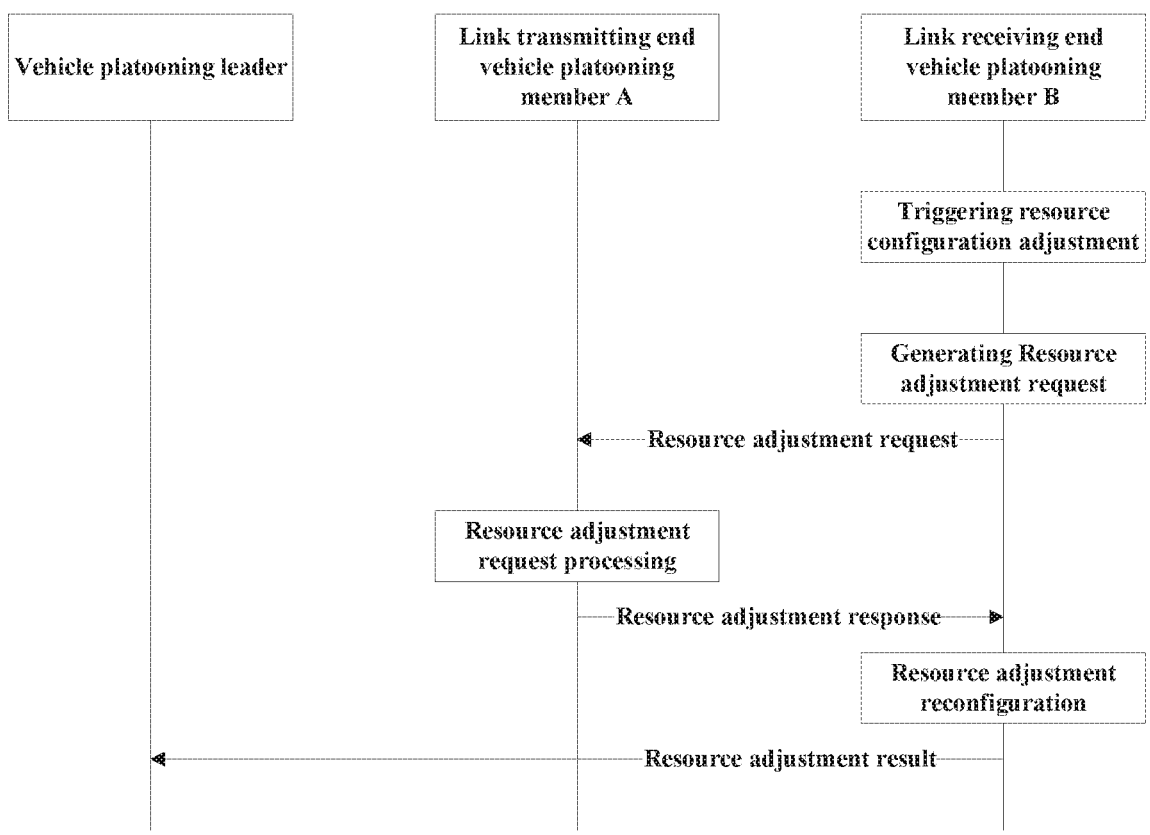
Figure 12:
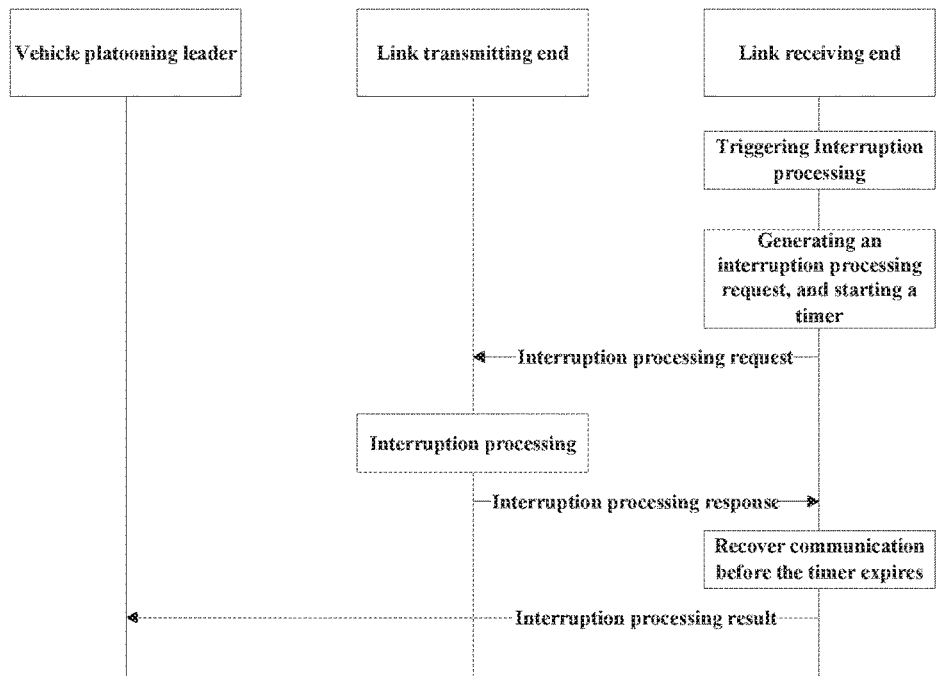
Figure 13:
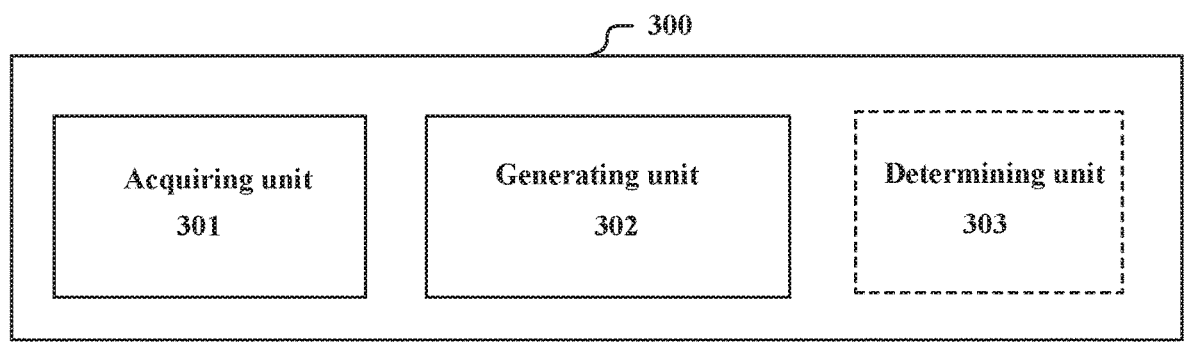
Figure 14:
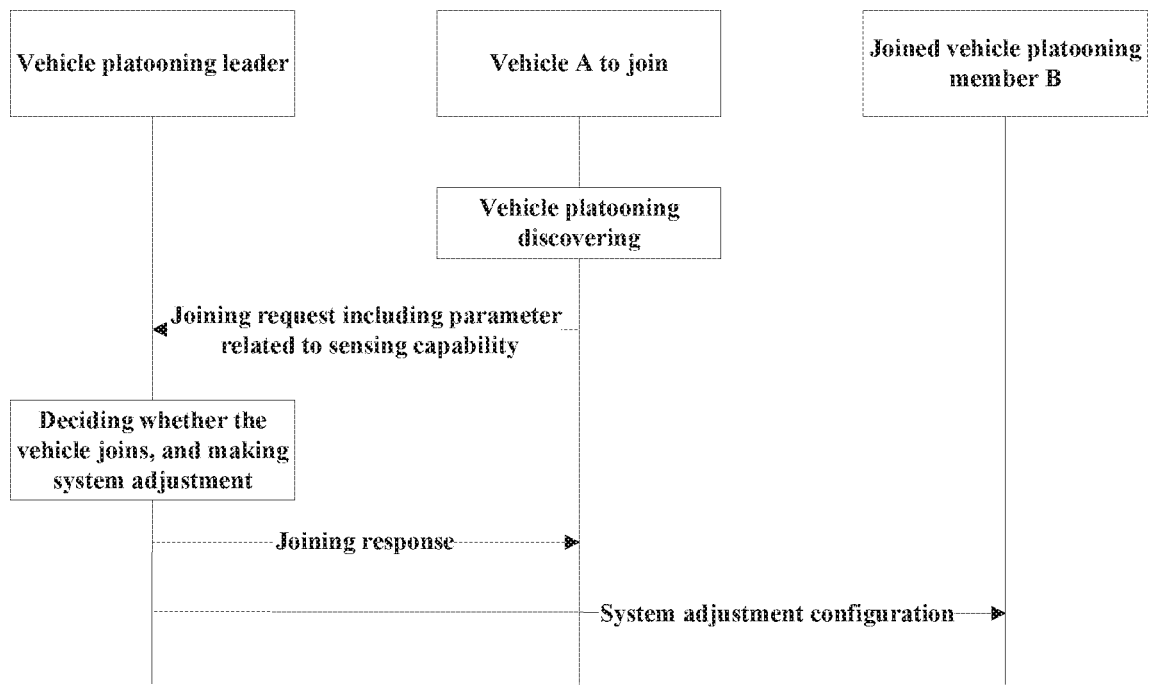
Figure 15:
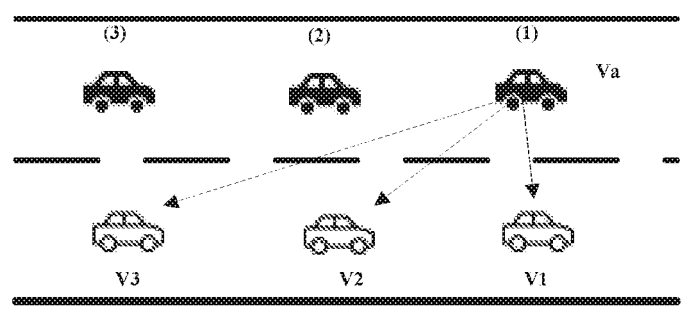
Figure 16:
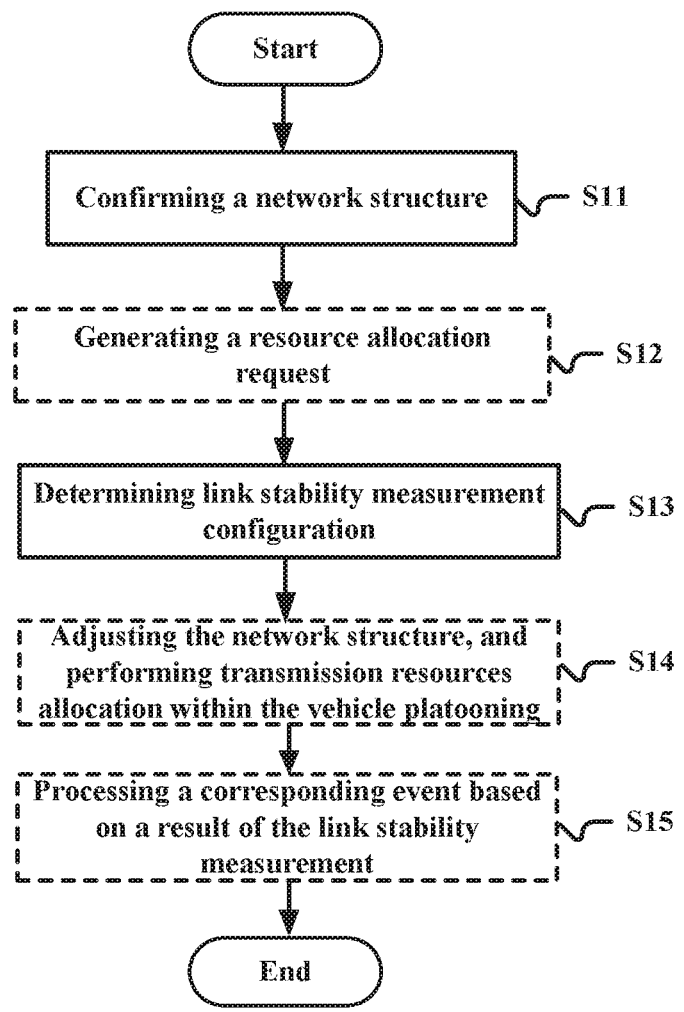
Figure 17:
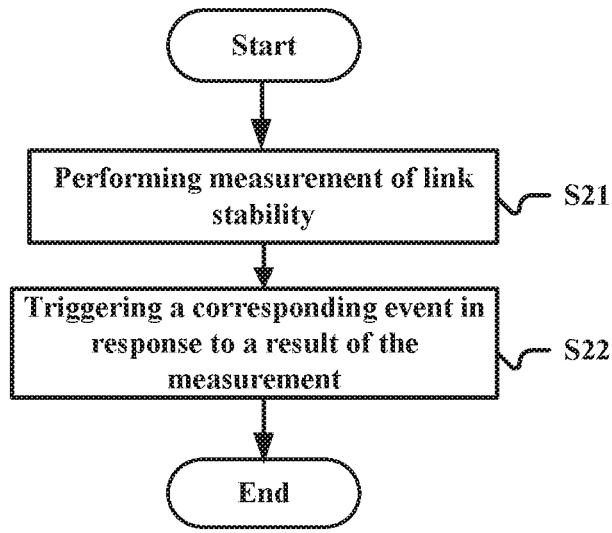
Figure 18:
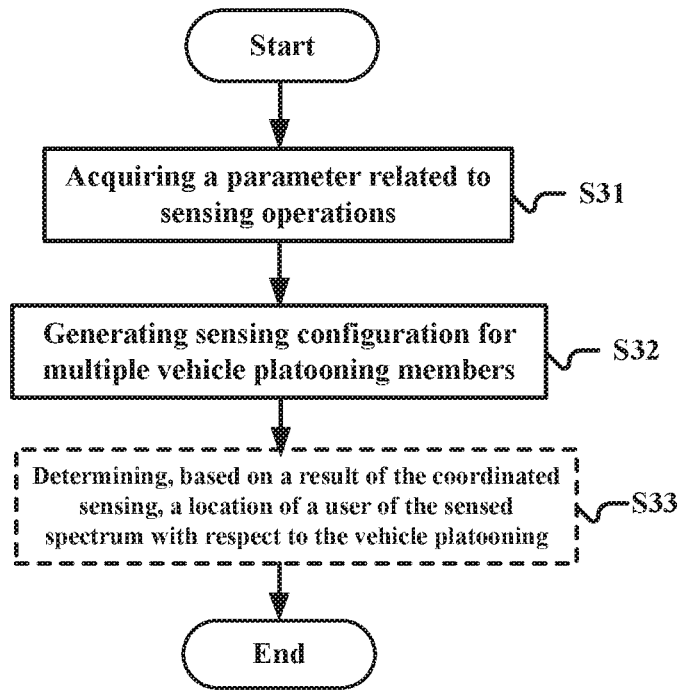
Figure 19:
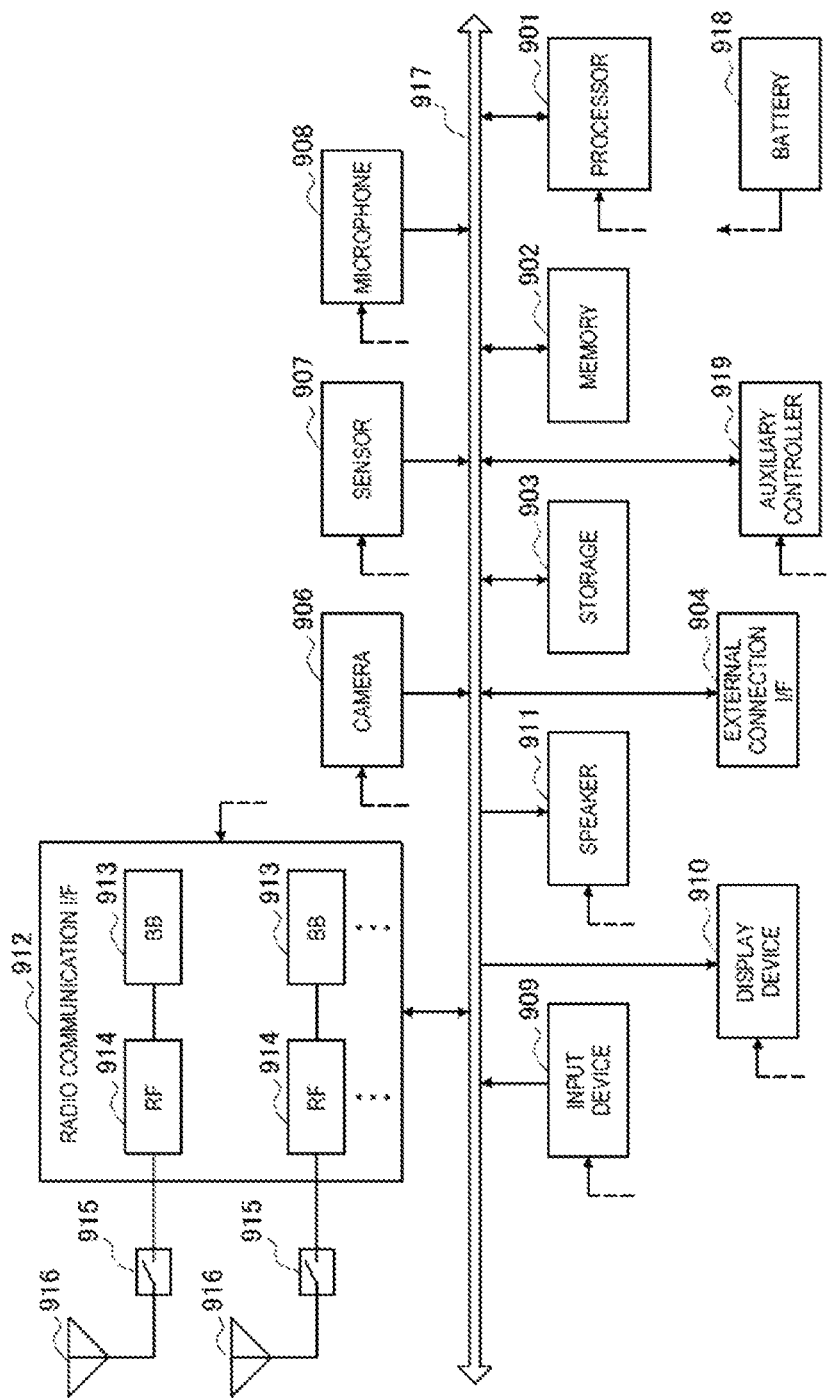
Figure 20:
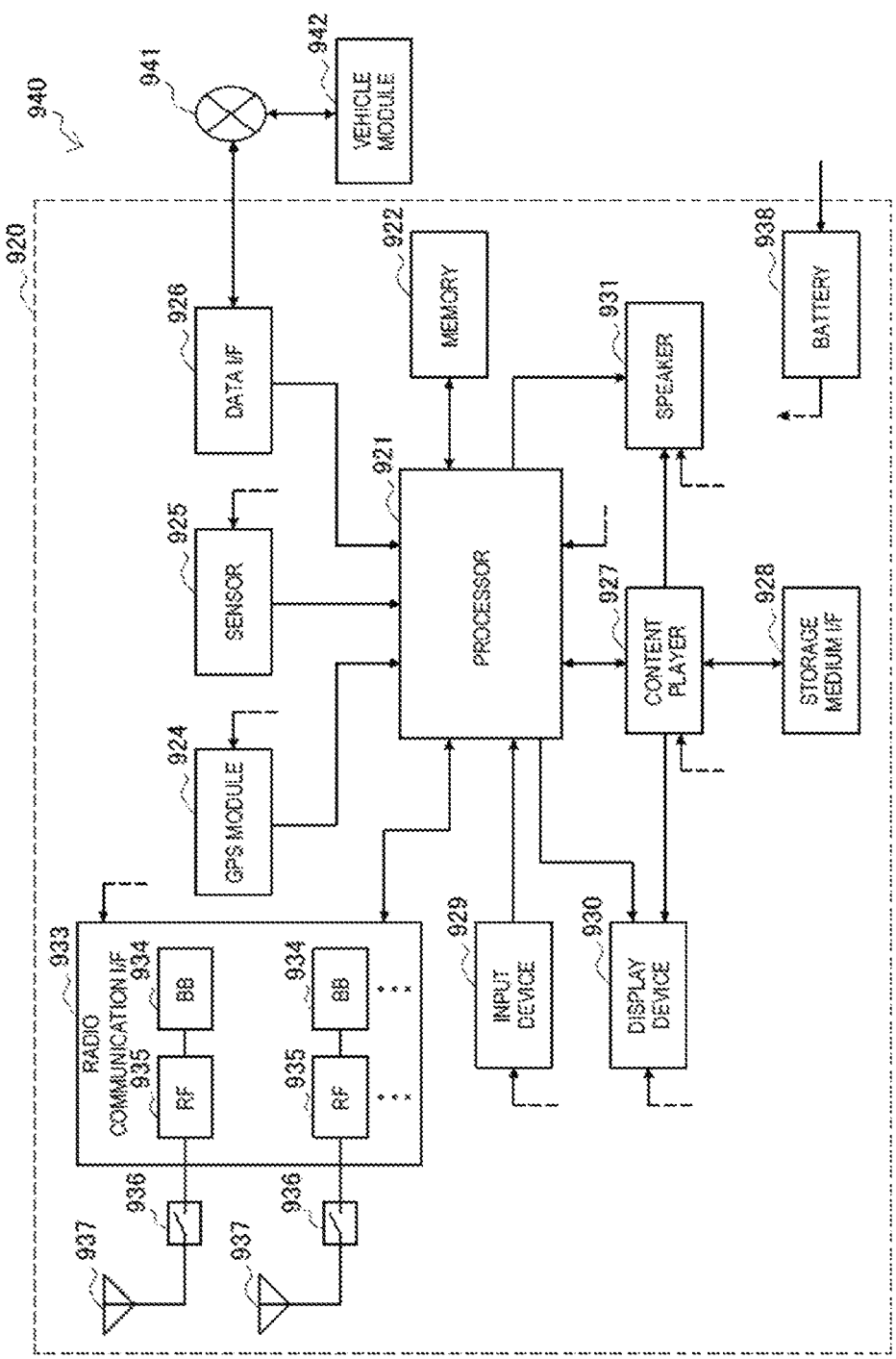
Figure 21:
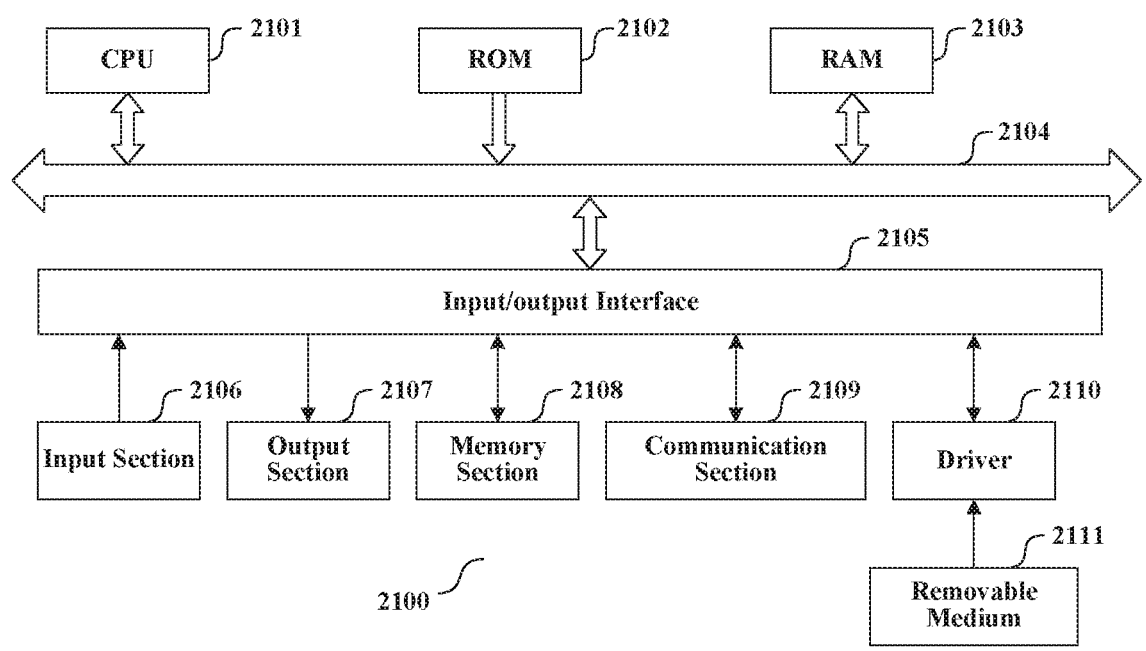

(a) to (e) of FIG. 3 show five examples of the architecture of network communications according to an embodiment of the present application:

FIG. 4 is a block diagram showing functional modules of an electronic apparatus for wireless communications according to an embodiment of the present disclosure;

FIG. 5 is a flowchart showing information interaction between a network terminal and a vehicle platooning leader according to an embodiment of the present application;

FIG. 6 is a block diagram showing functional modules of an electronic apparatus for wireless communications according to an embodiment of the present disclosure;

FIG. 7 is a schematic diagram showing an information procedure between a vehicle platooning leader and vehicle platooning members according to an embodiment of the present application;

FIG. 8 is a block diagram showing functional modules of an electronic apparatus for wireless communications according to an embodiment of the present disclosure:

FIG. 9 is a schematic diagram showing an information procedure of starting link stability measurement and triggering event processing according to an embodiment of the present application;

FIG. 10 is a block diagram showing functional modules of an electronic apparatus for wireless communications according to another embodiment of the present disclosure;

FIG. 11 is a schematic diagram showing an information procedure of resource configuration adjustment according to an embodiment of the present application;

FIG. 12 is a schematic diagram showing an information procedure of interruption processing according to an embodiment of the present application;

FIG. 13 is a block diagram showing functional modules of an electronic apparatus for wireless communications according to another embodiment of the present disclosure:

FIG. 14 shows an information procedure when a vehicle joins a vehicle platooning according to an embodiment of the present application;

FIG. 15 shows a schematic example of an application of determining, based on a result of coordinated sensing, a location of a user of the sensed spectrum with respect to a vehicle platooning:

FIG. 16 is a flowchart showing a method for wireless communications according to an embodiment of the present application:

FIG. 17 is a flowchart showing a method for wireless communications according to another embodiment of the present application:

FIG. 18 is a flowchart showing a method for wireless communications according to another embodiment of the present application;

FIG. 19 is a block diagram illustrating an example of a schematic configuration of a smart phone to which the technology of the present disclosure may be applied;

FIG. 20 is a block diagram illustrating an example of a schematic configuration of an car navigation device to which the technology of the present disclosure may be applied; and FIG. 21 is a block diagram of an exemplary block diagram illustrating the structure of a general purpose personal computer capable of realizing the method and/or device and/or system according to the embodiments of the present invention.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
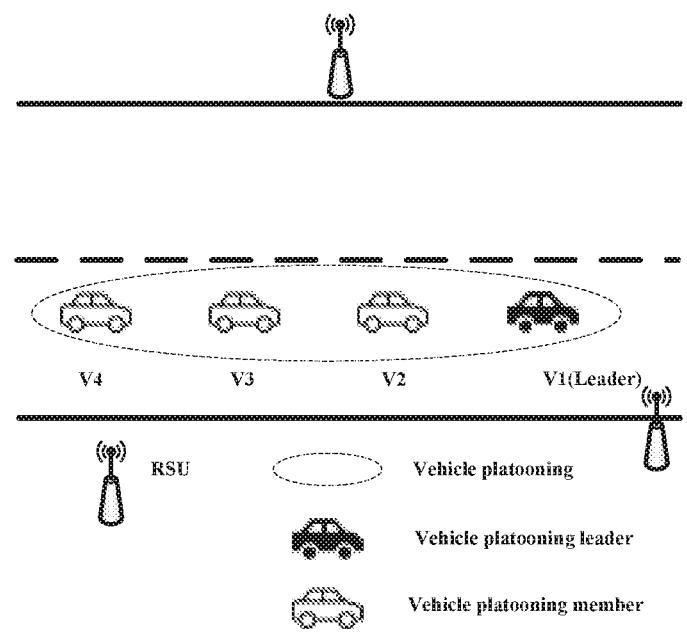
FIG. 1 shows an example of entities in a vehicle platooning driving mode.

FIG. 1 shows an example of entities in a vehicle platooning driving mode. In this example, a vehicle platooning creator is responsible for creating a vehicle platooning. A vehicle platooning leader is responsible for managing the vehicle platooning. The vehicle platooning creator and the vehicle platooning leader may be the same or different. Other vehicles in the vehicle platooning are called vehicle platooning members. It should be understood that hereinafter, under appropriate circumstances, such as in describing features for all vehicles in the vehicle platooning, the vehicle platooning members may also include the vehicle platooning leader.

For example, the vehicle platooning leader updates surrounding traffic information from the vehicle platooning members in real time, and reports the information to a Road Side Unit (RSU). In addition, the vehicle platooning leader may further receive traffic information of a road farther away from the Road Side Unit and share the information with the vehicle platooning members. All vehicle platooning members may share the information via a V2X sidelink (also called as a PC5 link) in the vehicle platooning. It can be seen that the system performance of the vehicle platooning driving mode depends on quality and stability of communication links between the vehicle platooning members.

Figure 2:
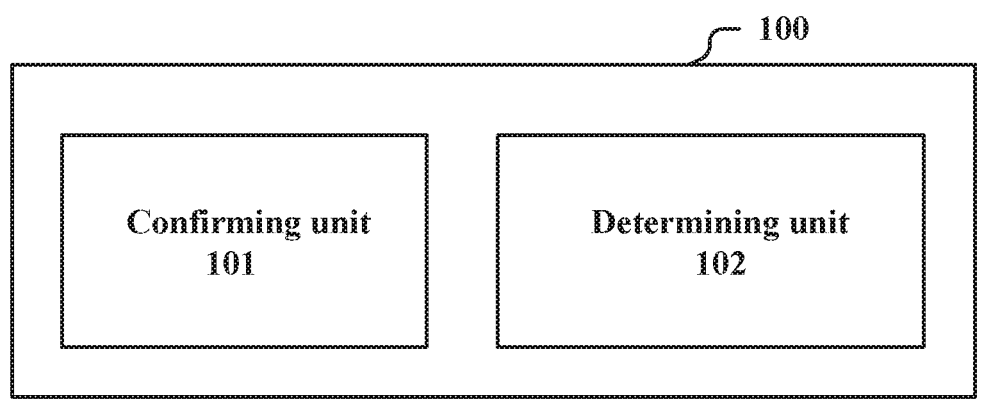
FIG. 2 is a block diagram showing functional modules of an electronic apparatus for wireless communications according to an embodiment of the present disclosure.

An electronic apparatus for measuring link stability in a vehicle platooning is provided according to the embodiment. FIG. 2 is a block diagram showing functional modules of an electronic apparatus 100. As shown in FIG. 2, the electronic apparatus 100 includes: a confirming unit 101, configured to confirm a network structure of a vehicle platooning; and a determining unit 102, configured to determine link stability measurement configuration corresponding to the network structure. The link stability measurement configuration is used for determining stability of a link by a receiving end device of the link according to a receiving state with respect to transmission content.

The confirming unit 101 and the determining unit 102 may be implemented by one or more processing circuits, and the processing circuits may be implemented, for example, as a chip. The electronic apparatus 100 may be located, for example, in the vehicle platooning leader.

For example, the network structure of the vehicle platooning may include one or more of the following aspects: a size of the vehicle platooning; a form of the vehicle platooning; and architecture of network communications. The size of the vehicle platooning may indicate the number of the included vehicle platooning members. The form of the vehicle platooning indicates organization of the vehicle platooning, such as a column of vehicles (as shown in the example of FIG. 1), or vehicles that are not necessarily arranged in a column but are arranged flexibly and driving collaboratively. The architecture of network communications represents the way in which the vehicle platooning members communicate, such as the composition of the link and the specific form of communications.

a) to e) of FIG. 3 show five examples of the architecture of network communications. The five forms of network architecture are described respectively below. However, it should be understood that the present application is not limited to the architecture of network communications shown in FIG. 3, which is merely exemplary. For convenience of description, data transmission toward the vehicle platooning leader in a data link is defined as forward transmission, and transmission apart from the vehicle platooning leader is defined as backward transmission. A neighbor member closest to a current member in the forward transmission is defined as a predecessor of the current member, and a neighbor member closest to the current member in the backward transmission is defined as a successor of the current member.

In a) of FIG. 3, the vehicle platooning leader broadcasts information to the vehicle platooning members, and the vehicle platooning members transmit information to the vehicle platooning leader via a single hop link, such as V3'V1. If the same reception quality is to be achieved at the vehicle platooning leader, the closer the member is to the leader, the smaller the transmission power is to be required.

In b) of FIG. 3, the vehicle platooning leader broadcasts information to the vehicle platooning members, and the vehicle platooning members transmit information to the vehicle platooning leader via unidirectional links between adjacent vehicle platooning members. In other words, the vehicle platooning member establishes a unidirectional link with a predecessor member, such as V3→V2. In this way, a unidirectional link for forward transmission is established between two adjacent vehicle platooning members. Because the adjacent vehicles are close in distance, only low transmission power is required for the link.

In c) of FIG. 3, the vehicle platooning leader broadcasts information to the vehicle platooning members, and there exist bidirectional links between adjacent vehicle platooning members. That is, on the basis of architecture b, unidirectional links between vehicle platooning members and successor members are added, such as V2→V3. In this way, a bidirectional link is established between two adjacent vehicle platooning members. The advantage of this architecture lies in that information interaction between the adjacent vehicle platooning members is easily implemented.

In d) of FIG. 3, the adjacent vehicle platooning members interchange information with each other via the bidirectional links. In other words, architecture d differs from architecture c in that: in the architecture d, there is no broadcast link from the vehicle platooning leader to the vehicle platooning members, and all members maintain bidirectional links with neighbor members. The advantage of this architecture lies in that a low transmission power is required due to short links between adjacent members.

In e) of FIG. 3, the vehicle platooning is divided into multiple clusters, adjacent cluster leaders interchange information via the bidirectional links, and each cluster may be configured using any one of a) to d). This architecture is, in particular, suitable for the vehicle platooning with a large size. For example, the number of vehicle platooning members supported in LTE eV2X may be up to 19. In order to reduce latency of information interaction between the vehicle platooning leader and vehicle platooning members, the vehicle platooning may be divided into multiple clusters according to the architecture e), and each cluster consists of a cluster leader and cluster members. The vehicle platooning leader also functions as the cluster leader of a first cluster, the bidirectional links are formed between adjacent cluster leaders, and each cluster is configured using any one of a) to d). The vehicle platooning leader only needs to manage the cluster leaders, and the cluster leader manages the cluster members. In the architecture e), the electronic apparatus 100 may also be located in the cluster leader.

The architecture of network communications in the vehicle platooning may be set according to the size of the vehicle platooning, communication power settings, and the like. The size of the vehicle platooning may indicate the number of the vehicle platooning members included in the vehicle platooning. For example, in the case that the size of the vehicle platooning is less than a threshold N1 (such as 3), the architecture a) is selected. In the case that the size of the vehicle platooning is greater than the threshold N1 and less than a threshold N2 (such as 5), the architecture b) is selected. In the case that the size of the vehicle platooning is greater than the threshold N1 and less than the threshold N2, and adjacent vehicles need to interchange information with each other, the architecture c) is selected. In the case that the vehicle platooning leader has a limited transmission power, the architecture d) is selected. In the case that the size of the vehicle platooning is greater than N2, it is required to divide the vehicle platooning into clusters and select cluster leaders, and the network structure of each cluster may be either selected by the vehicle platooning leader uniformly or selected by the cluster leader by itself.

The confirming unit 101 and the determining unit 102, for example, may perform respective operations in response to at least one of the following: a predetermined period of time has elapsed, a size of the vehicle platooning changes; information interaction requirement between vehicle platooning members changes; and available network transmission resources change. In other words, the operations of the confirming unit 101 and the determining unit 102 may be periodical and/or trigger based.

The confirming unit 101 and the determining unit 102 perform operations in a predetermined period, and can determine a change in a network structure in time, such as entry and departure of a vehicle platooning member, a change in the form of the vehicle platooning, and a change in the architecture of network communication of the vehicle platooning, such as changing from the architecture a) to the architecture c).

The confirming unit 101 and the determining unit 102 may operate in response to triggering. The trigger condition may be any condition that can cause a change in the network structure. For example, in the case that the size of the vehicle platooning changes, the architecture of network communications of the vehicle platooning may change. In addition, in the case that the information interaction requirement for the vehicle platooning members changes, for example, in the case that an amount of information to be interchanged changes due to a change in the driving state or a state of surrounding traffic environment, the architecture of the network communications may change. A quantization parameter of information interaction between the vehicle platooning members may be an amount of information to be reported by a single vehicle platooning member within unit time, or an amount of information to be transmitted by a single link within unit time, which is indicated as MessageSizePerUnit. The parameter may be related to the network structure as described later. Alternatively, the trigger condition may also be a change in available transmission resources notified by a network terminal (eNB/RSU). In this case, the network structure may be changed to adapt to the change in the transmission resources.

As described above, in the case of adopting different network structures, the link configuration for the vehicle platooning may be different. Therefore, the determining unit 102 determines corresponding link stability measurement configuration according to the network structure. In the embodiment of the present application, the link stability measurement configuration is used for determining stability of a link by a receiving end device of the link according to a receiving state with respect to the transmission content. In other words, the transmission status of the link is utilized to evaluate the stability of the link.

In the LTE, there are provided two link quality measurement parameters related to the sidelink, which respectively are sidelink reference signal received power (S-RSRP) and sidelink discovery reference signal received power (SD-RSRP). However, while the two parameters are measured, user equipment cannot transmit and receive data at the same time. Therefore, the process of determining the stability of the link by measuring the two parameters may occupy a large amount of time used for effective data transmission, which is not suitable for scenarios where information is required to be interchanged frequently in the vehicle platooning driving mode.

In the present embodiment, the characteristic that the vehicles in the vehicle platooning may frequently interchange information is utilized, so that a receiving end vehicle evaluates stability of a link by monitoring a receiving state while receiving useful information, thereby being capable of accurately evaluating the stability of the link with a significant decrease in control signaling overhead, induced latency, and required energy consumption. On the other hand, it is assumed that data can be simultaneously transmitted and received in the manner of evaluating the stability of the link by measuring the above two parameters. In this case, compared with the LTE, with the method according to the present embodiment, the control signaling overhead and the required energy consumption can be reduced, thereby improving the actual data transmission efficiency.

The link stability measurement configuration includes, for example, a correspondence between a link transmission mode and link stability. The link transmission mode includes, for example, the number of times of transmission performed on the link within a predetermined period of time, and the link stability includes the number or a ratio of times of successful reception within a fixed length of time, for example, unit time. The transmission content may be signaling such as beacon, control signaling, and a discovery message, or may also be data, and the like.

As an example, in the case that transmission on a link is periodical transmission, the link transmission mode may be an interval period during which the transmission is performed on the link, and the link stability is a ratio of successful reception within a fixed length of time. For example, the electronic apparatus 100 may support two central control scheduling methods, which are decided and configured by the eNB/RSU, and are respectively dynamic scheduling and semi-persistent scheduling (SPS). In the dynamic scheduling, a new scheduling decision is required to be made for each subframe, that is, a resource location is decided. The method has high flexibility in resource usage. In the semi-persistent scheduling, in addition to the resource location, a scheduling interval, that is, transmission period information, is further decided. In the case that configuration is unchanged, the resource location only needs to be sent once by the PDCCH, and the transmission period is configured through RRC signaling, that is, scheduled resources may be used at a set period. This method reduces signaling overhead and is suitable for transmission requirement where an amount of the data is periodical, such as suitable for transmission in the vehicle platooning driving mode. Therefore, in the case that the SPS is adopted, the link stability measurement configuration depends on a specific resource allocation method. On the other hand, in the case that the SPS is not adopted, the transmission may not be periodical, and transmission resources allocated for each link may also affect the number of times of transmission within a predetermined period of time, further affecting the link stability measurement configuration. The determining unit 102 may be configured to determine, according to the transmission resources allocated for each link, the link stability measurement configuration for the link to be provided to corresponding vehicle platooning members.

In addition, the link stability measurement configuration may also be affected by the network environment, such as the number and density of surrounding vehicles, the number and frequency of messages transmitted by the surrounding vehicles, and the type of transmission content.

As another example, the link stability may also be the number of times of continuous transmission during which the information is not received successfully within a fixed length of time, or a ratio of these number of times of transmission to the predicted number of times of transmission. Alternatively, the link stability may indicate that information parsed from a message indicates that a vehicle distance maintains stable for a certain length of time.

The link stability measurement configuration may be obtained from the network terminal, or may be determined based on a pre-stored correspondence between the network structure and the link stability measurement configuration. Furthermore, as described above, the determining unit 102 may also adjust, according to transmission resources allocated for each link, link stability measurement configuration for the link.

Transmission resources required for communications in the vehicle platooning may be, for example, obtained by sending a request to the network terminal such as the eNB or RSU from the vehicle platooning leader, and the vehicle platooning leader allocates the obtained transmission resources within the vehicle platooning. As shown in FIG. 4, the electronic apparatus 100 further includes a generating unit 103, configured to generate, based on the confirmed network structure, a resource allocation request to be used for requesting the network terminal to allocate network transmission resources for the vehicle platooning.

In one example, the generating unit 103 may estimate a total amount of required resources within the vehicle platooning, and contain the estimated total amount of required resources in the resource allocation request. The required resources within the vehicle platooning include resources required for the vehicle platooning leader/the vehicle platooning cluster leaders to send messages, and the vehicle platooning cluster leaders/the vehicle platooning members to return messages. For example, the generating unit 103 may perform the estimating according to at least one of the network structure, a data processing mode of a forwarding node, and an amount of information to be transmitted by vehicle platooning members within unit time.

The data processing mode of the forwarding node may include: forwarding only or merging and forwarding. Amounts of resources required by the two methods are different. As an example, the generating unit 103 may determine, based on the network structure, an amount of information to be transmitted by vehicle platooning members within unit time. There is a correspondence between the network structure and the amount of information to be transmitted by the vehicle platooning members within unit time. This correspondence, for example, may be stored in advance in a storage device of the vehicle platooning leader. In this way, after the network structure is confirmed, the amount of information to be transmitted by the vehicle platooning members within unit time can be known.

Further, as described above, the SPS resource allocation manner is suitable for communications in the vehicle platooning driving mode. Therefore, the generating unit 103 may generate, based on the estimated total amount of required resources, one or more SPS configuration requests as the resource allocation request. In one example, each vehicle or each link may require one or more SPS configurations, and the generating unit 103 may merge these SPS configurations based on considerations of reducing an amount of information required for resource allocation request signaling. The merging method may include, for example, merging SPS configurations with the same transmission start time instant and interval period, or merging SPS configurations with the same spectrum resources in the interval period. The merging may lead to one or more SPS configuration requests. The multiple SPS configurations for each vehicle or each link may be used for interaction of different types of information.

In another example, the resource allocation request generated by the generating unit 103 includes an identifier of network architecture for the vehicle platooning and information of a size of the vehicle platooning. In this example, after receiving the resource allocation request, the network terminal can confirm the network architecture of the vehicle platooning according to the identifier of the network architecture for the vehicle platooning, so as to estimate a total amount of required resources for the vehicle platooning in conjunction with the size of the vehicle platooning. In other words, the total amount of required resources for the vehicle platooning is estimated on the network terminal.

Next, the network terminal may allocate resources including, for example, spectrum resources and time configuration, to the vehicle platooning according to the total amount of required resources of the vehicle platooning. In the case that the SPS resource allocation manner is adopted, the network terminal may generate one or more SPS configurations.

Although not shown in FIG. 4, the electronic apparatus 100 may further include a transceiving unit configured to transmit a resource allocation request to the network terminal and receive a resource allocation result from the network terminal. The transceiving unit may be implemented, for example, as an antenna and a corresponding transceiving circuit, or the like.

In order to facilitate understanding, FIG. 5 is a flowchart showing information interaction between a network terminal and a vehicle platooning leader. The vehicle platooning leader triggers the confirmation of the network structure of the vehicle platooning in response to, for example, one of the foregoing specific conditions, generates a resource allocation request, and transmits the resource allocation request to the network terminal (eNB/RSU). The eNB/RSU allocates resources according to the request and transmits a resource allocation response to the vehicle platooning leader. In an example, the resource allocation response may further include link stability measurement configuration corresponding to the network structure.

After acquiring the transmission resources, the vehicle platooning leader allocates the transmission resources within the vehicle platooning. Accordingly, as shown in FIG. 6, the electronic apparatus 100 may further include an allocating unit 104 configured to allocate the transmission resources within the vehicle platooning.

If the transmission resources allocated by the network terminal meet the total amount of required resources for the vehicle platooning, the allocating unit 104 allocates the transmission resources to the vehicle platooning members according to the previously confirmed network structure and requirements of the respective links. If the transmission resources allocated by the network terminal are less than the total amount of required resources for the vehicle platooning, the confirming unit 101 may adjust, based on the network transmission resources actually allocated by the network terminal, the network structure of the vehicle platooning, for example, the architecture of network communications of the vehicle platooning, and the allocating unit 104 allocates the transmission resources within the vehicle platooning based on the adjusted network structure.

In addition, the network terminal may further include an adjustable range of the network transmission resources when allocating the network transmission resources for the vehicle platooning, and the allocating unit 104 notifies the vehicle platooning members of the adjustable range when allocating the transmission resources to the vehicle platooning members. For example, the adjustable range may include at least: the frequency or number of times for message transmission is reduced within a resource allocation range, or the original resource configuration is restored after adjustment. Alternatively, the adjustable range may also be set by the vehicle platooning leader.

The adjustable range is set, such that when the driving state of the vehicle is stable or the link quality is good, the frequency of data interaction can be reduced, thereby reducing the required transmission resources.

After the allocating unit 104 completes resources allocation and the transceiving unit notifies the respective vehicle platooning members of an allocation result and the aforementioned stability measurement configuration, each of the vehicle platooning members can communicate based on the allocation result and meanwhile measure the link stability according to the stability measurement configuration.

In order to facilitate understanding, FIG. 7 is a schematic diagram showing an information procedure between a vehicle platooning leader and vehicle platooning members. The vehicle platooning leader allocates the transmission resources to each member (or each link) according to the network structure, and provides a resource allocation result to each member. The resource allocation result shown in FIG. 7 further includes the aforementioned stability measurement configuration and/or an adjustable range of resources. Subsequently, the vehicle platooning members perform communication and link stability measurement based on the resource allocation result.

Furthermore, as shown in FIG. 8, the electronic apparatus 100 may further include an event processing unit 105 configured to process a respective event based on a result of the link stability measurement. These events include, for example, link resource configuration adjustment, interruption processing, and the like.

It should be understood that the result of the link stability measurement described herein may be a result of the link stability measurement for vehicle platooning members, or a result of the link stability measurement for a vehicle platooning leader or cluster leaders themselves. In addition, although not shown in the figure, the electronic apparatus 100 may further include the generating unit 103 and the allocating unit 104 shown in FIG. 6.

For example, in the case that the result of the link stability measurement indicates that the current link state is good, the frequency of data interaction can be reduced; otherwise, the frequency of data interaction needs to be increased. In addition, adjustment of the frequency of data interaction also needs to meet the frequency range required by the data type. For example, information related to the driving safety may have the limit for the lowest frequency, and the adjusted frequency of data interaction has to meet the limit for the lowest frequency. Furthermore, the adjustment of the frequency of data interaction further needs to meet the inherent limit of data updating capabilities. For example, the updating frequency of data processed by an in-vehicle control system, which is collected by a sensor, may have the limit for the highest frequency, and the frequency of data interaction may be adjusted in consideration of the limit for the highest frequency, so that unnecessary information interaction is reduced. When the frequency of data interaction changes, it may be necessary to change the allocation of the transmission resources, that is, adjusting link resource configuration. Accordingly, the allocating unit 104 may be configured to perform, based on the result of the link stability measurement, re-allocation of the transmission resources within the vehicle platooning. In an example, in the case that the resource configuration changes within the adjustable range of resources, such as reducing the frequency of data interaction or restoring the original resource configuration, a transmitting side device of a link can perform adjusting by itself, and a receiving end device of the link can report the adjustment to the vehicle platooning leader or cluster leaders. Alternatively, the allocating unit 104 may accordingly adjust resource allocation for the link. In addition, in the case that the resource configuration changes beyond the adjustable range of resources, the allocating unit 104 performs resource re-allocation.

On the other hand, the allocating unit 104 may also perform re-allocation of the transmission resources within the vehicle platooning according to variation of an amount of information to be transmitted by the vehicle platooning members. For example, the amount of information to be transmitted by the vehicle platooning members is affected by a driving state of the vehicles and a state of surrounding traffic. In the case that the driving state is unstable or the state of surrounding traffic is unstable, the amount of information to be transmitted increases. Accordingly, the allocating unit 104 is required to allocate more transmission resources to links in which the vehicles are located.

In the case that the result of the link stability measurement indicates that the link is interrupted, the event processing unit 105 performs interruption processing. A strategy of the link interruption processing depends on the network structure and/or a degree of influence produced to driving of the vehicle platooning by the link interruption. The link interruption is an extreme case where link stability degrades. For example, in the case that a receiving end of a link fails to receive information for a continuous predetermined period of time, or a predetermined number of times of reception failure occur, the link is considered to be interrupted. The link interruption may be caused by obstacles between vehicles, traffic rules, and the like. For example, another vehicle jumps a queue, or traffic signals prevent a vehicle at one end of a link from traveling on city roads.

Specifically, in a case that a receiving end device of a link confirms that a link from the vehicle platooning leader or cluster leader is interrupted, an interruption restoring request may be transmitted to the vehicle platooning leader or cluster leader. If the receiving end device receives an interruption processing response from the vehicle platooning leader or cluster leader within a predetermined period of time, the previous link may be restored; otherwise, the link mode or the network structure of the vehicle platooning may be changed or the link may be abandoned. The specific strategy depends on the current network structure and/or a degree of influence produced to driving of the vehicle platooning by the interrupted link. The strategy may be notified to the respective vehicle platooning members when the transmission resources are initially allocated to links.

In addition, in a case that the receiving end device of the link confirms that a link from another vehicle platooning member is interrupted, similarly, an interruption restoring request may be transmitted to the vehicle platooning member functioning as the transmitting end. If the receiving end device receives an interruption processing response transmitted by the transmitting end within a predetermined period of time, the previous link may be restored; otherwise, the link interruption is reported to the vehicle platooning leader or cluster leader, and the vehicle platooning leader or cluster leader makes further decisions.

FIG. 9 is a schematic diagram showing an information procedure of starting link stability measurement and triggering event processing. In FIG. 9, a link transmitting end vehicle platooning member A transmits a message to a receiving end vehicle platooning member B, and the vehicle platooning member B performs link stability measurement while receiving the message, and triggers corresponding event processing when a predetermined condition is met. The event processing may be performed by the link receiving end and/or the vehicle platooning leader or cluster leader. It should be understood that although the transmitting and receiving ends are shown as the vehicle platooning members in FIG. 9, the present disclosure is not limited thereto, and one of the transmitting and receiving ends may be the vehicle platooning leader or cluster leader.

To sum up, the electronic apparatus 100 according to the embodiment can perform measurement of the link stability by using link stability measurement configuration corresponding to the network structure of the vehicle platooning, and can quickly and accurately measure the stability of the link in the vehicle platooning and perform corresponding event processing by using a result of the link stability measurement.

Second Embodiment

FIG. 10 is a block diagram showing functional modules of an electronic apparatus 200 for wireless communications according to another embodiment of the present disclosure. As shown in FIG. 10, the electronic apparatus 200 includes: a measuring unit 201, configured to measure link stability based on link stability measurement configuration for a link, wherein, a link receiving end is a vehicle (or specifically, an in-vehicle terminal of the vehicle) where the electronic apparatus is located, and a link transmitting end is another vehicle (or specifically, an in-vehicle terminal of the another vehicle) in the vehicle platooning; and an event triggering unit 202, configured to trigger a corresponding event according to a result of the measurement.

The measuring unit 201 and the event triggering unit 202 may be implemented by one or more processing circuits. The processing circuit may be implemented as a chip, for example. The electronic apparatus 200 may be located, for example, in the vehicle platooning member or in the vehicle platooning leader.

In an example, the link stability measurement configuration is used for determining stability of a link by a receiving end device of the link according to a receiving state with respect to transmission content. Details related to the link stability measurement configuration have been described in the first embodiment, which are not repeated here anymore.

The event triggering unit 202 may trigger a resource configuration adjusting event according to the result of the measurement. Accordingly, as shown by a dashed line block in the figure, the electronic apparatus 200 may further include a generating unit 203 configured to generate a resource configuration adjustment request. In addition, although not shown in the figure, the electronic apparatus 200 may further include a transceiving unit configured to transmit the generated resource configuration adjustment request. The transceiving unit may be implemented, for example, as an antenna and a transceiving circuit, or the like.

Specifically, the result of the link stability measurement may reflect stability of a current link. In the case that the stability of the link is good, the frequency of data transmission can be reduced, and thus requirement for transmission resources can be reduced. In a case that resource configuration adjustment is within an adjustable range of resources, such as reducing the transmission frequency or restoring to the original resource configuration, the generating unit 203 may generate a resource configuration adjustment request to be transmitted to a link transmitting end. In some cases, such as for V3 and V4 in the architecture b of FIG. 3, there is no direct link between the V3 and the transmitting end V1 and between the V4 and the transmitting end V1, and the request is to be forwarded via other vehicles. After receiving the request, the link transmitting end determines whether the resource adjustment can be performed, and transmits a result as a resource adjustment response to a receiving end device of the link. The link receiving end device performs resource adjustment reconfiguration according to the resource adjustment response. If the devices at both ends of the link perform resource adjustment reconfiguration, the link receiving end may report an adjustment result to the vehicle platooning leader or cluster leader, so that the vehicle platooning leader or cluster leader can adjust the resource allocation within the vehicle platooning according to the result.

On the other hand, in a case that the resource configuration adjustment goes beyond the adjustable range of resources, such as increasing the transmission frequency or increasing the amount of information to be transmitted, the generating unit 203 may generate an adjustment request to be transmitted to the vehicle platooning leader of the vehicle in which the electronic apparatus is located, so that the vehicle platooning leader re-allocates resources.

Further, as described above, the event triggering unit 202 may further trigger a resource configuration adjustment event according to variation of an amount of information to be transmitted. Information to be transmitted includes parameters of vehicle driving such as the vehicle position, speed, acceleration, and the like, as well as surrounding traffic state measurement result. The amount of information is influenced by a driving state of the vehicles and a state of surrounding traffic. In the case that the vehicle driving state and the surrounding traffic state are relatively stable, the amount of information decreases; and in the case that the vehicle driving state and the surrounding traffic state are unstable, the amount of information increases.

In order to facilitate understanding, FIG. 11 is a schematic diagram showing an information procedure of resource configuration adjustment. In a link receiving end vehicle platooning member B, resource configuration adjustment is triggered in response to a result of the link stability measurement or variation of the amount of information to be transmitted, a resource configuration adjustment request is generated, and transmitted to a link transmitting end vehicle platooning member A. The vehicle platooning member A processes the request, generates a resource adjustment response and transmits the response to the vehicle platooning member B. The vehicle platooning member B performs resource adjustment reconfiguration according to the response and reports a result of the resource adjustment to the vehicle platooning leader. It should be understood that although the vehicle platooning leader and the vehicle platooning member are shown as two entities in FIG. 11, the link transmitting end may also be the vehicle platooning leader, and the vehicle platooning leader and the vehicle platooning member may be the same entity. In addition, the link receiving end may also be the vehicle platooning leader, and in this case, it is unnecessary to report a result of resource adjustment.

The event triggering unit 202 may further trigger a link interruption processing event according to the result of the measurement. As described above, in the case that reception fails for a continuous predetermined period of time, or in the case that reception fails for a predetermined number of times, the link is considered to be interrupted. In the link interruption processing, it can be attempted to restore the link first; and if the restoring fails, the interruption processing is performed according to a predetermined strategy. The strategy of the link interruption processing depends on a degree of influence produced to driving of the vehicle platooning by the link interruption and/or the network structure of the vehicle platooning. The strategy may be notified to the link receiving end by the vehicle platooning leader when transmission resources are allocated for the link or when stability measurement configuration is performed.

For example, in the case that some link, such as the broadcast link from the vehicle platooning leader in the architectures a to c of FIG. 3, is interrupted, the vehicle platooning cannot travel. In this case, according to the strategy of the interruption processing, the link receiving end vehicle may be excluded from the vehicle platooning, and the network architecture of the vehicle platooning is adjusted accordingly. However, even if some link, such as V2→V3 in the architecture c of FIG. 3, is interrupted, the vehicle platooning can still travel, and only performance may be affected. In this case, according to the interruption strategy, no processing may be performed or the vehicle platooning leader or cluster leader makes further decisions according to the actual situation.

Furthermore, the generating unit 203 may further generate a report containing a result of the interruption processing to notify the vehicle platooning leader. The link performing the notification may be a direct link from a receiving end of the link to the vehicle platooning leader, or an indirect link to the vehicle platooning leader in the vehicle platooning, or the notification is forwarded through the network terminal (eNB/RSU). This depends on a driving mode and a communications state of the link receiving end vehicle after the interruption processing.

In order to facilitate understanding, as an example, FIG. 12 is a schematic diagram showing an information procedure of interruption processing. The link receiving end triggers interruption processing, generates an interruption processing request, starts a timer simultaneously, and transmits the interruption processing request to the link transmitting end. The link transmitting end performs the interruption processing and transmits an interruption processing response. If the link receiving end receives the interruption processing response before the end of the interruption processing, the communication may be restored; otherwise the communication cannot be restored. Subsequently, the link receiving end reports a result of the interruption processing to the vehicle platooning leader. It should be noted that although the vehicle platooning leader and the link transmitting end are shown as two independent entities in FIG. 12, the link transmitting end may be the vehicle platooning leader, and the vehicle platooning leader and the link transmitting end may be the same entity. In addition, the link receiving end may also be the vehicle platooning leader. In this case, it is unnecessary to report a result of the interruption processing.

Processing examples when different links are interrupted under different architectures of network communications are described hereinafter.

In a first example, a backward link between the cluster leaders, such as V1→Vm+1, in the architecture e is interrupted. According to the flow shown in FIG. 12, a link receiving end cluster leader Vm+1 triggers interruption processing, generates an interruption processing request, starts a timer Timer1, and transmits the interruption processing request to a link transmitting end cluster leader V1 through the link Vm+1→V1. After receiving the request, the V1 performs interruption restore processing and transmits an interruption processing response. If the link receiving end cluster leader Vm+1 receives the interruption processing response or receives data from V1 before the Timer1 expires, the vehicle platooning continues to travel in the original vehicle platooning manner, and normal communication is restored. If the link fails to restore before the Timer1 expires, the original vehicle platooning is divided into two vehicle platoonings, with the V1 and the Vm+1 as the vehicle platooning leaders respectively. Information of members in the vehicle platooning Vm+1 may be periodically updated by the vehicle platooning leader V1 to other cluster leaders during the previous driving process. Alternatively, the information of members may be acquired from the Road Side Unit by the Vm+1. In this case, the link receiving end cluster leader Vm+1 reports a result of the interruption processing to the vehicle platooning leader Vm by forwarding through the network terminal (eNB/RSU). The above processing is also suitable for a case that a forward link between the cluster leaders, such as Vm+1→V1, in the architecture e is interrupted, or two links are both interrupted; or a case that a forward or backward link between adjacent members in the architecture d is interrupted.

In a second example, a backward link between the vehicle platooning leader and the member, such as V1→V3, in the architectures a to c is interrupted. According to the flow shown in FIG. 12, a link receiving end member V3 triggers interruption processing, generates an interruption processing request, starts a timer Timer2, and transmits the interruption processing request to a link transmitting end vehicle platooning leader V1 through a forward link. After receiving the request, the V1 performs interruption restore processing and transmits an interruption processing response. If the V3 receives the interruption processing response or receives data from V1 before the Timer2 expires, the vehicle platooning continues to travel in the original vehicle platooning manner, and normal communication is restored. If the link fails to restore before the Timer2 expires, the processing is as follows depending on the specific architecture: in the architecture a, the V3 travels independently, and the V1 updates the member information; in the architecture b, the V3 travels independently, and the V1 transmits a notification to instruct the V4 to establish a forward link with another neighbor in the vehicle platooning; in the architecture c, the V3 travels independently, and the V1 transmits a notification to instruct V4 to establish bidirectional links with other neighbors in the vehicle platooning. In this case, the link receiving end member V3 reports a result of the interruption processing to the vehicle platooning leader V1 by forwarding through the network terminal. The above processing is also suitable for the forward link in the architectures a to c.

In a third example, a backward link between adjacent members, such as V2'V3, in the architecture c is interrupted. According to the flow shown in FIG. 12, the link receiving end member V3 triggers interruption processing, generates an interruption processing request, starts a timer Timer3, and transmits the interruption processing request to the link transmitting end member V2 through a forward link. After receiving the request, the V2 performs interruption restore processing and transmits an interruption processing response. If the link receiving end member V3 receives the interruption processing response or receives data from V2 before the Timer3 expires, the vehicle platooning continues to travel in the original vehicle platooning manner, and normal communication is restored. If the link fails to restore before the Timer3 expires, the V3 reports the link interruption to the vehicle platooning leader through the forward link and the vehicle platooning leader makes further decisions.

To sum up, the electronic apparatus 100 according to the embodiment measures the link stability by using the link stability measurement configuration corresponding to the network structure of the vehicle platooning, and can quickly and accurately measure the stability of the link in the vehicle platooning and trigger the corresponding event according to the result of the link stability measurement.

Third Embodiment

FIG. 13 is a block diagram showing functional modules of an electronic apparatus 300 for wireless communications according to another embodiment of the present disclosure. As shown in FIG. 13, the electronic apparatus 300 includes: an acquiring unit 301, configured to acquire parameters related to sensing operations of vehicle platooning members; and a generating unit 302, configured to generate, based on the parameters, sensing configuration for multiple vehicle platooning members in the vehicle platooning, in which the multiple vehicle platooning members perform coordinated sensing based on the sensing configuration.

The acquiring unit 301 and the generating unit 302 may be implemented by one or more processing circuits, and the processing circuits, for example, may be implemented as a chip. The electronic apparatus 300 may be located, for example, in the vehicle platooning leader.

In the V2X, the vehicle senses signal strength on spectrum resources to determine a busy degree of resource usage, thereby helping to adjust parameter configuration of the transmitting end. Since the system for sensing and decision-making cannot depending on a single network node cannot meet requirements under advanced driving modes, it is necessary to provide sensing technology for the actual requirements of the advanced driving modes of the vehicle platooning.

In the present embodiment, in order to overcome the influence of signal fading and perform rapid sensing, coordinated sensing is used. In other words, the multiple vehicle platooning members jointly sense the spectrum resources, and a final sensing result is obtained through information interaction. The coordinated sensing may be performed by the multiple vehicle platooning members in a frequency domain and/or a time domain.

In the coordinated sensing, it is required to determine the vehicle platooning members involved in sensing and sensing configuration for each of the vehicle platooning to members involved in sensing. The sensing configuration includes, for example, one or more of the following: the vehicle platooning members involved in sensing, a spectrum range and a time range to be sensed, reporting of sensing results, and resource configuration for the reporting of results. Specifically, the vehicle platooning members involved in sensing indicates which vehicle platooning members are to be involved in sensing. The spectrum range and the time range to be sensed indicate an object to be sensed by each of the coordinated vehicle platooning members. The reporting of sensing results indicates the format in which the sensing results are reported, for example, reporting of binary detection results, reporting of direct energy sampling results, and reporting of energy quantization results, and different formats of reporting contain different amounts of information. The resource configuration for the reporting of results indicates which transmission resources are used for reporting. All sensed spectrums for the coordinated sensing may be a set of resources allocated to the vehicle platooning leader by the network terminal, or may be a resource pool available to the vehicle platooning leader.

In the present embodiment, the generating unit 302 generates the above-described sensing configuration based on the parameters related to the sensing operation. These parameters are obtained by the acquiring unit 301 from the network terminal or the vehicle platooning members. As an example, the parameters related to the sensing operation may include one or more of the following: a de-correlation distance, the number of valid sensing nodes, sensing capability of the vehicle platooning members, and locations of the vehicle platooning members.

The de-correlation distance and the number of valid sensing nodes may be obtained by sending a request to the network terminal. The request for these parameters may be transmitted to the network terminal separately, or may be included in a request for traffic environment information to be transmitted to the network terminal.

There are two main factors affecting the performance of coordinated sensing, namely, the number of sensing nodes for sensing the same spectrum and a distance between the sensing nodes. Too many sensing nodes may result in large energy consumption, and thus the number of valid sensing nodes is used to limit the number of sensing nodes. On the other hand, a small distance between the sensing nodes cannot resist shadow correlation. The correlation is affected by propagation environment, and is commonly described as an exponential function $R(d)=e^{-ad}$, where d indicates a distance (m) between the sensing nodes, a indicates an environment parameter, such as a ≈0.1204/m in a urban non on-line-of-sight environment, and a ≈0.002/m in a suburban environment, and e indicates a natural constant. The de-correlation distance d0 may be defined as a minimum distance such that the shadow correlation is less than a certain predetermined threshold. Therefore, the de-correlation distance may be directly configured, based on environmental factors, by the network terminal (eNB or RSU) for the vehicle platooning leader. Alternatively, a calculation model is preset, the network terminal configures environmental parameters and thresholds for the vehicle platooning leader, and the vehicle platooning leader calculates the de-correlation distance by itself. In addition, the network terminal or the vehicle platooning leader may also use an average value or a preset static value as the de-correlation distance.

In addition, the sensing capability of the vehicle platooning members, and locations of the vehicle platooning members may be obtained from the vehicle platooning members. Information of sensing capability of a vehicle platooning member may be reported to the vehicle platooning leader along with a joining request when the vehicle platooning member joins the vehicle platooning. FIG. 14 shows a corresponding information procedure. A vehicle A to be joined finds the vehicle platooning through a vehicle platooning discovery process, and intends to join. The vehicle A transmits to a target vehicle platooning leader a joining request which may include related parameters identifying the sensing capability of the vehicle A. and these parameters include, for example, receiving sensitivity and an adjustable range of the receiving sensitivity. The vehicle platooning leader decides whether the vehicle can join and whether the vehicle platooning system requires to be adjusted. The vehicle platooning leader notifies the vehicle A of a decision result by a joining response. If the vehicle A is allowed to join, the response includes joining configuration, and both parties complete follow-up operations; and otherwise, the vehicle A is not allowed to join. If the joining of the vehicle A impacts on vehicle platooning system configuration, the vehicle platooning leader requires to send adjusted configuration to an affected vehicle platooning member B. In addition, if the vehicle platooning leader changes, the vehicle platooning member information may be forwarded by the original vehicle platooning leader or notified to a new vehicle platooning leader in a form of reporting again by the vehicle platooning members. Alternatively, the vehicle platooning member information is backed up in the RSU and the RSU forwards the information to the new vehicle platooning leader.

The generating unit 302 generates appropriate sensing configuration by comprehensively considering the various parameters described above. The vehicle platooning members involved in coordination perform sensing based on respective sensing configuration and provide sensing results to the vehicle platooning leader.

In an example, a format of the reporting of the sensing results is configured to depend at least on the results of the link stability measurement. As mentioned above, different formats of the report of the sensing results may have different amounts of information, and thus the format of the reporting further depends on information required to be obtained, and resource configuration for reporting. When it is just required to determine whether there is signal strength in a target spectrum range, resources for reporting are extremely limited, or link stability is poor, a simple reporting format may be adopted, for example, only a binary sensing result is reported.

In addition, as for the resource configuration for reporting the sensing results, one design is that others report the results while some vehicle platooning members perform sensing, thereby preventing resources contention for reporting the results. In this case, there should be no interferences, including interferences caused by in-band or out-of-band leakage, between the spectrum for sensing and the spectrum for reporting, to ensure accuracy of the sensed results.

Accordingly, as shown in a dashed line block in FIG. 13, the electronic apparatus 300 may further include a determining unit 303 configured to determine link stability measurement configuration corresponding to a network structure of a vehicle platooning. The link stability measurement configuration is used for determining stability of a link by a receiving end device of the link according to a receiving state with respect to the transmission content. A detailed description of the link stability measurement configuration has been given in the first embodiment and will not be repeated here.

In addition, the direct energy sampling results and energy quantization information can provide additional information, such as a location of a user of a target spectrum with respect to the vehicle platooning. Accordingly, the determining unit 303 may be further configured to determine, based on a result of the coordinated sensing, a location of a user of the sensed spectrum with respect to the vehicle platooning.

FIG. 15 shows a schematic example of an application of determining, based on a result of coordinated sensing, a location of a user of a sensed spectrum with respect to a vehicle platooning. V1, V2, and V3 indicate three vehicles that constitute a vehicle platooning, in which the V1 is the vehicle platooning leader; a target spectrum to be sensed by the vehicle platooning is being used by vehicle Va, and (1)~(3) indicate three different locations of the vehicle Va. Dashed lines with arrows indicate propagation paths of wireless signals. For example, at the location (1), a path difference between the Va and the vehicles V1 to V3 causes a difference in energy strength sensed at the V1 to V3. For example, the energy sensed at the V1 is highest, and the energy sensed at the V3 is lowest. Similarly, if the Va is at the location (2), the energy sensed at the V2 is the highest, the energy sensed at the V1 and the V3 are close. If the Va is at the location (3), the energy sensed at the V3 is the highest and the energy sensed at the V1 is the lowest. Therefore, by comparison of results of the energy sensed at the V1 to the V3, a location relationship between the Va and the vehicle platooning may be estimated. It can be seen that if it is desired to estimate a location of a target vehicle with respect to the vehicle platooning, vehicles for the coordinated sensing have to perform sensing in the same time range, and thus a sensing time range corresponding to the spectrum range requires to be set in the sensing configuration. In addition, if there are multiple vehicles using the target spectrum for sensing, a location determined based on the sensing results is not a location of a certain vehicle with respect to the vehicle platooning, but a location of aggregated energy generated during resources usage of multiple vehicles with respect to the vehicle platooning.

To sum up, the electronic apparatus 300 according to the present embodiment generates the sensing configuration for each of the vehicle platooning members, so that multiple vehicle platooning members performs coordinated sensing, thereby improving accuracy and speed of the sensing.

Fourth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method for wireless communications described below may be executed by a computer-executable program completely, although the hardware and/or firmware of the electronic apparatus for wireless communications can also be used in the methods.

FIG. 16 is a flowchart showing a method for wireless communications according to an embodiment of the present application. The method includes: confirming a network structure of a vehicle platooning (S11); determining link stability measurement configuration corresponding to the network structure (S13), the link stability measurement configuration being used for determining stability of a link by a receiving end device of the link according to a receiving state with respect to transmission content.

For example, the above method includes performing the confirming and determining in response to at least one of the following: a predetermined period of time has elapsed; a size of the vehicle platooning changes; information interaction requirement between vehicle platooning members changes; and available network transmission resources change.

The network structure of the vehicle platooning includes one or more of the following: a size of the vehicle platooning; a form of the vehicle platooning; and architecture of network communications. As an example, the architecture of network communications of the vehicle platooning may include at least one of the following: 1) a vehicle platooning leader broadcasts information to vehicle platooning members, and the vehicle platooning members transmit information to the vehicle platooning leader via single hop links; 2) a vehicle platooning leader broadcasts information to vehicle platooning members, and the vehicle platooning members transmit information to the vehicle platooning leader via unidirectional links between adjacent vehicle platooning members; 3) a vehicle platooning leader broadcasts information to vehicle platooning members, and there exist bidirectional links between adjacent vehicle platooning members; 4) adjacent vehicle platooning members interchange information with each other via the bidirectional links; 5) the vehicle platooning is divided into multiple clusters, and adjacent cluster leaders interchange information via the bidirectional links, each cluster being configured using any one of 1) to 4).

As shown by a dashed line block in FIG. 16, the above method may further include step S12: generating, based on the confirmed network structure, a resource allocation request to be used for requesting a network terminal to allocate network transmission resources for the vehicle platooning. In step S12, a total amount of required resources within the vehicle platooning may be estimated, and the estimated total amount of required resources is included in the resource allocation request. For example, estimating may be performed according to at least one of the network structure, a data processing mode of a forwarding node, and an amount of information to be transmitted by vehicle platooning members within unit time. Based on the network structure, an amount of information to be transmitted by the vehicle platooning members within unit time may be determined. There is a correspondence between the network structure and the amount of information to be transmitted by the vehicle platooning members within unit time. As an example, based on the estimated total amount of required resources, one or more semi-persistent scheduling configuration requests may be generated as the resource allocation request.

Alternatively, the resource allocation request may include an identifier of architecture of network communications of the vehicle platooning and information of a size of the vehicle platooning. The network terminal estimates the total amount of required resources based on the identifier and the information of the vehicle platooning size.

As shown by another dashed line block in FIG. 16, the above method may further include step S14: adjusting the network structure of the vehicle platooning based on the network transmission resources actually allocated by the network terminal, and allocating transmission resources within the vehicle platooning based on the adjusted network structure.

In addition, an adjustable range of the allocated network transmission resources may also be acquired from the network terminal, and vehicle platooning members are notified of the adjustable range when the network transmission resources are allocated to the vehicle platooning members.

In step S13, the link stability measurement configuration may be acquired from the network terminal, or may be determined based on a pre-stored correspondence between the network structure and the link stability measurement configuration. For example, the link stability measurement configuration includes a correspondence between a link transmission mode and link stability. The link transmission mode may include the number of times of transmission performed on the link within a predetermined period of time, and the link stability includes the number or a ratio of times of successful reception within a fixed length of time.

According to the transmission resources allocated for each link, the link stability measurement configuration for the link may be determined to be provided to corresponding vehicle platooning members.

As shown by another dashed line block in FIG. 16, the above method may further include step S15: processing a respective event based on a result of the link stability measurement. For example, based on the result of the link stability measurement and/or variation of an amount of information to be transmitted by vehicle platooning members, re-allocation of the transmission resources may be performed within the vehicle platooning. Link interruption processing may be performed based on the result of the link stability measurement. A strategy of the link interruption processing depends on the network structure and/or a degree of influence produced to driving of the vehicle platooning by the link interruption.

FIG. 17 is a flowchart showing a method for wireless communications according to another embodiment of the present application. The method includes: measuring link stability based on link stability measurement configuration for a link (S21), in which, a receiving end of the link is a vehicle where the electronic apparatus is located, and a transmitting end of the link is another vehicle in a vehicle platooning; and triggering a corresponding event in response to a result of the measurement (S22).

For example, in step S22, a resource configuration adjusting event is triggered in response to the result of the measurement. The resource configuration adjusting event may also be triggered according to variation of an amount of information to be transmitted. An adjustment request to be transmitted to the transmitting end of the link is generated in the case that the resource configuration adjustment is within an adjustable range. An adjustment request to be transmitted to a vehicle platooning leader is generated in the case that the resource configuration adjustment goes beyond the adjustable range.

In step S22, a link interruption processing event may be triggered according to the result of the measurement. A strategy of the link interruption processing depends on a degree of influence produced to driving of the vehicle platooning by the link interruption and/or a network structure of the vehicle platooning.

The above method may further include: generating a report containing a result of the resource adjustment or a report containing a result of the interruption processing, to notify the vehicle platooning leader.

FIG. 18 is a flowchart showing a method for wireless communications according to another embodiment of the present application. The method includes: acquiring parameters related to sensing operations of vehicle platooning members (S31); and generating, based on the parameters, sensing configuration for multiple vehicle platooning members in a vehicle platooning, in which, the multiple vehicle platooning members perform coordinated sensing based on the sensing configuration (S32).

The above parameters may include one or more of the following: a de-correlation distance, the number of valid sensing nodes, sensing capability of the vehicle platooning members, and locations of the vehicle platooning members. The sensing configuration may include one or more of the following: the vehicle platooning members involved in sensing, a spectrum range and a time range to be sensed, reporting of sensing results, and resource configuration for the reporting of results.

Although not shown in the figure, the above method may further include: determining link stability measurement configuration corresponding to a network structure of a vehicle platooning. The link stability measurement configuration is used for determining stability of a link by a receiving end device of the link according to a receiving state with respect to the transmission content. A format of the reporting of the sensing results is configured to depend at least on a result of link stability measurement.

As shown by a dashed line block in FIG. 18, the above method may further include step S33: determining, based on a result of the coordinated sensing, a location of a user of a sensed spectrum with respect to the vehicle platooning.

It is to be noted that, the above methods can be performed separately or in combination with each other, and the details thereof are described in the first to the third embodiments and are not repeated herein.

The technology of the present disclosure may be applied to various products. For example, the electronic apparatus 100 to 300 may be implemented as terminal apparatus. The terminal apparatus may be realized as a mobile terminal such as a smartphone, a tablet personal computer (PC), a notebook PC, a portable game terminal, a portable/dongle type mobile router, and a digital camera, or an in-vehicle terminal such as Vehicle User Equipment (VUE), a smart automobile control system, and an car navigation apparatus. These in-vehicle terminals may be built-in or external. The terminal apparatus may also be realized as a terminal (also referred to as a machine type communication (MTC) terminal) that performs machine-to-machine (M2M) communication. Furthermore, the terminal apparatus may be a radio communication module (such as an integrated circuit module including a single die) mounted on each of the terminals.

[Application Example Regarding Terminal Apparatus]

First Application Example

FIG. 19 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a memory medium, such as a semiconductor memory and a hard disc. The external connection interface 904 is an interface configured to connect an external apparatus (such as a memory card and a universal serial bus (USB) device) to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are inputted to the smartphone 900 into audio signals. The input device 909 includes, for example, a touch sensor configured to detect touch onto a screen of the display device 910, a keypad, a keyboard, a button, or a switch, and receives an operation or information inputted from a user. The display device 910 includes a screen such as a liquid crystal display (LCD) and an organic light-emitting diode (OLED) display, and displays an output image of the smartphone 900. The speaker 911 converts the audio signal that is outputted from the smartphone 900 into sound.

The radio communication interface 912 supports any cellular communication scheme (such as LTE and LTE-Advanced), and performs wireless communication. The radio communication interface 912 may include for example a BB processor 913 and an RF circuit 914. The BB processor 913 may perform, for example, encoding/decoding, modulating/demodulating, and multiplexing/demultiplexing, and performs various types of signal processing for radio communication. The RF circuit 914 may include a mixer, a filter and an amplifier for example, and transmits and receives a radio signal via the antenna 916. The radio communication interface 912 may be a chip module on which the BB processor 913 and the RF circuit 914 are integrated. The radio communication interface 912 may include the multiple BB processors 913 and the multiple RF circuits 914, as illustrated in FIG. 19. Although FIG. 19 illustrates an example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 19. Although FIG. 19 shows the example in which the smartphone 900 includes the multiple antennas 916, the smartphone 900 may also include a single antenna 916.

In addition, the smartphone 900 may include antennas 916 for different radio communication schemes. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to the modules of the smartphone 900 shown in FIG. 19 via a feeder line. The feeder line is partially shown with a dash line in the figure. The auxiliary controller 919 controls a minimum necessary function of the smartphone 900, for example, in a sleep mode.

In the smartphone 900 illustrated in FIG. 19, the transceiving unit described in the first to third embodiments may be implemented by the radio communication interface 912. At least a part of functions may be implemented by the processor 901 or the auxiliary controller 919. For example, the processor 901 or the auxiliary controller 919 may confirm a network structure and determine link stability measurement configuration by performing the functions of the confirming unit 101 and the determining unit 102, may measure the link stability and trigger a corresponding event by performing the functions of the measuring unit 201 and the triggering unit 202, and may generate sensing configuration for coordinated sensing by performing the functions of the acquiring unit 301 and the generating unit 302.

Second Application Example

FIG. 20 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937 and a battery 938.

The processor 921 may be for example a CPU or a SoC, and controls a navigation function and another function of the car navigation apparatus 920. The memory 922 includes RAM and ROM, and stores a program that is executed by the processor 921, and data.

The GPS module 924 measures a location of the car navigation apparatus 920 (such as a latitude, a longitude and a height) using a GPS signal received from a GPS satellite. The sensor 925 may include a group of sensors such as a gyroscope sensor, a geomagnetic sensor and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may include for example a BB processor 934 and an RF circuit 935. The BB processor 934 may perform encoding/decoding, modulating/demodulating and multiplexing/demultiplexing for example, and perform various types of signal processing for wireless communication. The RF circuit 935 may include a mixer, a filter and an amplifier for example, and transmits and receives a radio signal via the antenna 937. The radio communication interface 933 may also be a chip module on which the BB processor 934 and the RF circuit 935 are integrated. The radio communication interface 933 may include multiple BB processors 934 and multiple RF circuits 935, as illustrated in FIG. 20. Although FIG. 20 shows an example in which the radio communication interface 933 includes multiple BB processors 934 and multiple RF circuits 935, the radio communication interface 933 may include a single BB processor 934 or a single RF circuit 935.

In addition to the cellular communication scheme, the radio communication interface 933 may support another type of wireless communication scheme, such as a short-distance wireless communication scheme, a near field communication scheme and a wireless LAN scheme. In this case, the radio communication interface 933 may include a BB processor 934 and an RF circuit 935 for each of the radio communication schemes.

Each of the antenna switches 936 switches connection destinations of the antennas 937 among multiple circuits (such as circuits for different wireless communication schemes) included in the radio communication interface 933.

Each of the antennas 937 includes one or more antenna elements (such as multiple antenna elements included in a MIMO antenna) and is used for the radio communication interface 933 to transmit and receive a radio signal. As shown in FIG. 20, the car navigation apparatus 920 may include multiple antennas 937. Although FIG. 20 illustrates the example in which the car navigation apparatus 920 includes the multiple antennas 937, the car navigation apparatus 920 may also include a single antenna 937.

In addition, the car navigation apparatus 920 may include antennas 937 for different radio communication schemes. In this case, the antenna switch 936 may be omitted from the configuration of the car navigation apparatus 920.

The battery 938 supplies power to the modules of the car navigation apparatus 920 shown in FIG. 20 via a feeder line. The feeder line is partially shown with a dash line in the figure. The battery 938 accumulates power supplied form the vehicle.

In the car navigation apparatus 920 illustrated in FIG. 20, the transceiving unit described in the first to third embodiments may be implemented by the radio communication interface 933. At least a part of functions may be implemented by the processor 921. For example, the processor 921 may confirm a network structure and determine link stability measurement configuration by performing the functions of the confirming unit 101 and the determining unit 102, may measure the link stability and trigger a corresponding event by performing the functions of the measuring unit 201 and the triggering unit 202, and may generate sensing configuration for coordinated sensing by performing the functions of the acquiring unit 301 and the generating unit 302.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and fault information, and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented in hardware, firmware, software or a combination thereof in any computing device (including a processor, a storage medium, etc.) or a network of computing devices by those ordinarily skilled in the art in light of the description of the present disclosure and making use of their general circuit designing knowledge or general programming skills.

Moreover, according to the present disclosure, a program product in which machine-readable instruction codes are stored is further disclosed. The instruction code, when read and executed by the machine, performs the method according to the embodiment of the disclosure.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2100 shown in FIG. 21) from a storage medium or network, wherein the computer is capable of implementing various functions when installed with various programs.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105, if needed. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved through software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The technology may also be configured as follows.

(1) An electronic apparatus for wireless communications, including:
  processing circuitry, configured to:
   confirm a network structure of a vehicle platooning; and
   determine link stability measurement configuration corresponding to the network structure, the link stability measurement configuration being used for determining stability of a link by a receiving end device of the link according to a receiving state with respect to transmission content.

(2) In the electronic apparatus, the processing circuitry is configured to perform the confirming and the determining in response to at least one of the following: a predetermined period of time has elapsed; a size of the vehicle platooning changes; information interaction requirement between vehicle platooning members changes; and available network transmission resources change.

(3) In the electronic apparatus, the network structure of the vehicle platooning includes one or more of the following: a size of the vehicle platooning; a form of the vehicle platooning; and architecture of network communications.

(4) In the electronic apparatus, the architecture of network communications of the vehicle platooning includes at least one of the following: 1) a vehicle platooning leader broadcasts information to vehicle platooning members, which transmit information to the vehicle platooning leader via single hop links; 2) the vehicle platooning leader broadcasts information to the vehicle platooning members, which transmit information to the vehicle platooning leader via unidirectional links between adjacent vehicle platooning members; 3) the vehicle platooning leader broadcasts information to the vehicle platooning members, and there exist bidirectional links between adjacent vehicle platooning members; 4) adjacent vehicle platooning members interchange information with each other via bidirectional links; 5) the vehicle platooning is divided into a plurality of clusters, and adjacent cluster leaders interchange information via bidirectional links, each cluster being configured using any one of 1) to 4).

(5) In the electronic apparatus, the processing circuitry is further configured to generate, based on the confirmed network structure, a resource allocation request to be used for requesting a network terminal to allocate network transmission resources for the vehicle platooning.

(6) In the electronic apparatus, the processing circuitry is further configured to estimate a total amount of required resources within the vehicle platooning, and contain the estimated total amount of required resources in the resource allocation request.

(7) In the electronic apparatus, the processing circuitry is configured to perform the estimating according to at least one of the network structure, a data processing mode of a forwarding node, and an amount of information to be transmitted by vehicle platooning members within unit time.

(8) In the electronic apparatus, the processing circuitry is configured to generate, based on the estimated total amount of required resources, one or more semi-persistent scheduling configuration requests as the resource allocation request.

(9) In the electronic apparatus, the resource allocation request includes an identifier of architecture of network communications of the vehicle platooning and information of a size of the vehicle platooning.

(10) In the electronic apparatus, the processing circuitry is further configured to determine, based on the network structure, an amount of information to be transmitted by vehicle platooning members within unit time, and wherein there is a correspondence between the network structure and the amount of information to be transmitted by the vehicle platooning members within unit time.

(11) In the electronic apparatus, the processing circuitry is further configured to adjust the network structure of the vehicle platooning based on the network transmission resources actually allocated by the network terminal, and allocate transmission resources within the vehicle platooning based on the adjusted network structure.

(12) In the electronic apparatus, the processing circuitry is further configured to acquire, from the network terminal, an adjustable range of the allocated network transmission resources, and notify the vehicle platooning members of the adjustable range when allocating the network transmission resources to the vehicle platooning members.

(13) In the electronic apparatus, the processing circuitry is configured to acquire the link stability measurement configuration from a network terminal, or determine the link stability measurement configuration based on a pre-stored correspondence between the network structure and the link stability measurement configuration.

(14) In the electronic apparatus, the link stability measurement configuration includes a correspondence between a link transmission mode and link stability.

(15) In the electronic apparatus, the link transmission mode includes the number of times of performing transmission on the link within a predetermined period of time, and the link stability includes the number or a ratio of times of successful reception within a fixed length of time.

(16) In the electronic apparatus, the processing circuitry is further configured to determine, according to the transmission resources allocated for each link, the link stability measurement configuration for the link to be provided to corresponding vehicle platooning members.

(17) In the electronic apparatus, the processing circuitry is further configured to process a respective event based on a result of the link stability measurement.

(18) In the electronic apparatus, the processing circuitry is configured to perform, based on the result of the link stability measurement and/or variation of an amount of information to be transmitted by the vehicle platooning members, re-allocation of the transmission resources within the vehicle platooning.

(19) In the electronic apparatus, the processing circuitry is configured to perform link interruption processing based on the result of the link stability measurement, and wherein a strategy of the link interruption processing depends on the network structure and/or a degree of influence produced to driving of the vehicle platooning by the link interruption.

(20) The present technology further provides an electronic apparatus for wireless communications, including:
processing circuitry, configured to:
perform measurement of link stability based on link stability measurement configuration for a link, wherein a receiving end of the link is a vehicle where the electronic apparatus is located, and a transmitting end of the link is another vehicle in a vehicle platooning; and
trigger a corresponding event in response to a result of the measurement.

(21) The electronic apparatus according to (20), wherein, the processing circuitry is configured to trigger a resource configuration adjusting event in response to the result of the measurement.

(22) The electronic apparatus according to (21), wherein, the processing circuitry is further configured to trigger the resource configuration adjusting event in response to variation of an amount of information to be transmitted.

(23) The electronic apparatus according to (21), wherein, the processing circuitry is configured to generate an adjust request to be transmitted to the transmitting end of the link, in the case that the resource configuration adjustment is within an adjustable range, and generate an adjust request to be transmitted to a vehicle platooning leader for the vehicle where the electronic apparatus is located, in the case that the resource configuration adjustment is not within the adjustable range.

(24) The electronic apparatus according to (20), wherein, the processing circuitry is configured to trigger a link interruption processing event in response to the result of the measurement.

(25) The electronic apparatus according to (24), wherein, a strategy of the link interruption processing depends on a degree of influence produced to driving of the vehicle platooning by the link interruption and/or a network structure of the vehicle platooning.

(26) The electronic apparatus according to (24), wherein, the processing circuitry is further configured to generate a report containing a result of the interruption processing to notify the vehicle platooning leader.

(27) An electronic apparatus for wireless communications, including:
processing circuitry, configured to:
acquire a parameter related to sensing operations of vehicle platooning members; and
generate, based on the parameter, sensing configuration for a plurality of vehicle platooning members in a vehicle platooning, wherein the plurality of vehicle platooning members perform coordinated sensing based on the sensing configuration.

(28) The electronic apparatus according to (27), wherein, the parameter includes one or more of the following: a de-correlation distance, the number of valid sensing nodes, sensing capability of the vehicle platooning members, and locations of the vehicle platooning members.

(29) The electronic apparatus according to (27), wherein, the sensing configuration includes one or more of the following: the vehicle platooning members involved in sensing, a spectrum range and a time range to be sensed, report of sensing results, and resource configuration for the report of results.

(30) The electronic apparatus according to (29), wherein, a format of the report of the sensing results is configured to depend at least on a result of link stability measurement.

(31) The electronic apparatus according to (30), wherein, the processing circuitry is further configured to determine link stability measurement configuration corresponding to a network structure of the vehicle platooning, the link stability measurement configuration being used for determining stability of a link by a receiving end device of the link according to a receiving state with respect to transmission content.

(32) The electronic apparatus according to (27), wherein, the processing circuitry is further configured to determine, based on a result of the coordinated sensing, a location of a user of the sensed spectrum with respect to the vehicle platooning.

(33) A method for wireless communications, comprising:
confirming a network structure of a vehicle platooning; and
determining link stability measurement configuration corresponding to the network structure, the link stability measurement configuration being used for determining stability of a link by a receiving end device of the link according to a receiving state with respect to transmission content.

(34) A method for wireless communications, comprising:
performing measurement of link stability based on link stability measurement configuration for a link, wherein a receiving end of the link is a vehicle where the electronic apparatus is located, and a transmitting end of the link is another vehicle in a vehicle platooning; and
triggering a corresponding event in response to a result of the measurement.

(35) A method for wireless communications, comprising:
acquiring a parameter related to sensing operations of vehicle platooning members; and
generating, based on the parameter, sensing configuration for a plurality of vehicle platooning members in a vehicle platooning, wherein the plurality of vehicle platooning members perform coordinated sensing based on the sensing configuration.

The invention claimed is:

1. An electronic apparatus for wireless communications, comprising:
processing circuitry, configured to:
confirm a network structure of a platoon of networked vehicles; and
determine a link stability measurement configuration corresponding to the network structure, the link stability measurement configuration being used for determining stability of a link by a receiving end device of the link according to a receiving state with respect to a transmission content,
determine, based on the confirmed network structure, an amount of information to be transmitted by platoon members within a unit time,
wherein there is a correspondence between the network structure and the amount of information to be transmitted by the platoon members within the unit time.

2. The electronic apparatus according to claim 1, wherein, the processing circuitry is configured to perform the confirming and the determining in response to at least one of the following:
a predetermined period of time has elapsed;
a platoon size change;
a platoon information interaction requirement change; or
an available network transmission resource change.

3. The electronic apparatus according to claim 1, wherein, the network structure of the platoon comprises one or more of the following:
a size of the platoon;
a form of the platoon; or
an architecture of a corresponding communication network.

4. The electronic apparatus according to claim 3, wherein the architecture comprises at least one of the following architecture features:
1) a platoon leader broadcasts information to the platoon members for relay via single hop links;
2) the platoon leader broadcasts information for relay via unidirectional links between adjacent platoon members;
3) the platoon leader broadcasts information to the platoon members, and there exist bidirectional links between adjacent platoon members;
4) adjacent platoon members interchange information with each other via bidirectional links;
5) the platoon is divided into a plurality of clusters, with adjacent cluster leaders configured to interchange information via bidirectional links, each cluster being configured using any one of 1) to 4).

5. The electronic apparatus according to claim 1, wherein, the processing circuitry is further configured to generate, based on the confirmed network structure, a resource allocation request to be used for requesting a network terminal to allocate network transmission resources for the platoon of networked vehicles.

6. The electronic apparatus according to claim 5, wherein, the processing circuitry is further configured to estimate a total amount of required resources within the platoon of networked vehicles, and include the estimated total amount of required resources in the resource allocation request.

7. The electronic apparatus according to claim 6,
wherein, the processing circuitry is configured to perform the estimating according to at least one of the network structure, a data processing mode of a forwarding node, or an amount of information to be transmitted by the platoon members within a predetermined time, or
wherein, the processing circuitry is configured to generate, based on the estimated total amount of required resources, one or more semi-persistent scheduling configuration requests as the resource allocation request.

8. The electronic apparatus according to claim 5, wherein, the resource allocation request comprises a platoon network architecture identifier and information of a size of the platoon.

9. The electronic apparatus according to claim 5, wherein, the processing circuitry is further configured to adjust the confirmed network structure based on the network transmission resources actually allocated by the network terminal, and allocate transmission resources within the platoon based on the adjusted network structure.

10. The electronic apparatus according to claim 9, wherein, the processing circuitry is further configured to acquire, from the network terminal, an adjustable range of the allocated network transmission resources, and notify the platoon members of the adjustable range when allocating the network transmission resources to the platoon members.

11. The electronic apparatus according to claim 9, wherein, the processing circuitry is further configured to determine, according to the transmission resources allocated for each link, the link stability measurement configuration for the link to be provided to corresponding platoon members.

12. The electronic apparatus according to claim 1, wherein, the processing circuitry is configured to acquire the link stability measurement configuration from a network terminal, or determine the link stability measurement configuration based on a pre-stored correspondence between the network structure and the link stability measurement configuration.

13. The electronic apparatus according to claim 1, wherein, the link stability measurement configuration comprises a correspondence between a link transmission mode and link stability.

14. The electronic apparatus according to claim 13, wherein, the link transmission mode comprises a number of times of performing transmission on the link within a predetermined period of time, and the link stability comprises a number or a ratio of times of successful reception within a fixed length of time.

15. A method for wireless communications, comprising:
confirming a network structure of a platoon of networked vehicles;
determining a link stability measurement configuration corresponding to the network structure, the link stability measurement configuration being used for determining stability of a link by a receiving end device of the link according to a receiving state with respect to a transmission content; and
determining, based on the confirmed network structure, an amount of information to be transmitted by platoon members within a unit time,
wherein there is a correspondence between the network structure and the amount of information to be transmitted by the platoon members within the unit time.

\* \* \* \* \*